US006872232B1

(12) United States Patent
Pavlatos

(10) Patent No.: US 6,872,232 B1
(45) Date of Patent: Mar. 29, 2005

(54) ENGINE WITH UPSTREAM AND ROTATIONALLY ATTACHED GUARD

(76) Inventor: Marina Ellen Marinella Pavlatos, 218 Thornapple Ct., Buffalo Grove, IL (US) 60089

( * ) Notice: Subject to any disclaimer, the term of this patent is extended or adjusted under 35 U.S.C. 154(b) by 0 days.

(21) Appl. No.: 10/148,507

(22) PCT Filed: Nov. 20, 2000

(86) PCT No.: PCT/US00/30145
§ 371 (c)(1),
(2), (4) Date: Jan. 9, 2003

(87) PCT Pub. No.: WO01/37968
PCT Pub. Date: May 31, 2001

Related U.S. Application Data

(60) Provisional application No. 60/167,163, filed on Nov. 23, 1999.

(51) Int. Cl.[7] .............................. B01D 33/15; F02G 3/00
(52) U.S. Cl. ............................. 55/306; 55/394; 55/396; 55/401; 55/406; 55/521; 60/39.092
(58) Field of Search ...................... 55/306, 394, 396, 55/401, 406, 521; 60/39.092

(56) References Cited

U.S. PATENT DOCUMENTS

| | | | |
|---|---|---|---|
| 2,695,074 A | 11/1954 | Kelly | |
| 2,931,460 A | 4/1960 | McEachern | |
| 2,944,631 A | 7/1960 | Kerry | |
| 2,969,941 A | 1/1961 | Hobart, Jr. | |
| 3,121,545 A | 2/1964 | Meletiou | |
| 3,148,043 A | 9/1964 | Richardson et al. | |
| 3,196,598 A | 7/1965 | Olson | |
| 3,302,395 A | 2/1967 | Robbins | |
| 3,426,981 A | 2/1969 | Allcock | |
| 3,444,672 A | 5/1969 | Alsobrooks | |
| 3,521,431 A | 7/1970 | Connors et al. | |
| 3,616,616 A | 11/1971 | Flatt | |
| 3,766,719 A | 10/1973 | McAnally, III | |
| 3,832,086 A | 8/1974 | Hull, Jr. et al. | |
| 3,871,844 A | 3/1975 | Calvin, Sr. | |
| 4,149,689 A | 4/1979 | McDonald | |
| 4,261,168 A | 4/1981 | Grigorian et al. | |
| 4,265,646 A | 5/1981 | Weinstein et al. | |
| 4,527,387 A | 7/1985 | Lastrina et al. | |
| 4,617,028 A | 10/1986 | Ray et al. | |
| 4,833,879 A | 5/1989 | Verduyn et al. | |
| 5,046,458 A | 9/1991 | Kronich | |
| 5,411,224 A | 5/1995 | Dearman et al. | |
| 6,319,304 B1 * | 11/2001 | Moredock | 95/269 |

FOREIGN PATENT DOCUMENTS

| | | |
|---|---|---|
| FR | 2 603 946 | 9/1982 |
| FR | 2 588 311 | 4/1987 |
| GB | 663194 | 12/1951 |
| NL | 1001992 | 9/1997 |

OTHER PUBLICATIONS

Supplemental European Search Report for 00991684.2 dated Dec. 20, 2002.

* cited by examiner

*Primary Examiner*—Robert A. Hopkins
(74) *Attorney, Agent, or Firm*—Katten Muchin Zavis Rosenman; John S. Paniaguas

(57) ABSTRACT

This invention relates in general to a guard(s)/cap(s) and/or screen(s) apparatus (single and/or multiple formation) for the nacelle/air inlet for numerous jets, turbojet, turboprop and turboshaft engines—(Helicopters and other VTOL/ VSTOL aircraft) such as power plants or the like. This apparatus contains the rotational system(s) as well as the engine shaft attached apparatus and/or pole that allows the mechanism to function by auto induced movement, without limiting engine thrust. Additional security measures have been introduced to the guard(s)/cap(s) and/or screen(s) apparatus, which includes a centrifuge chamber/manifold for particle collector without limiting engine thrust.

6 Claims, 19 Drawing Sheets

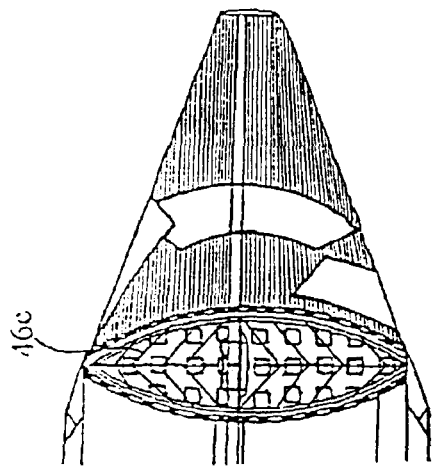
FIG. 4
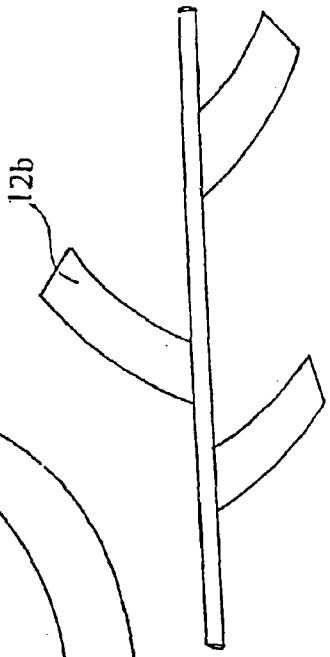
FIG. 7
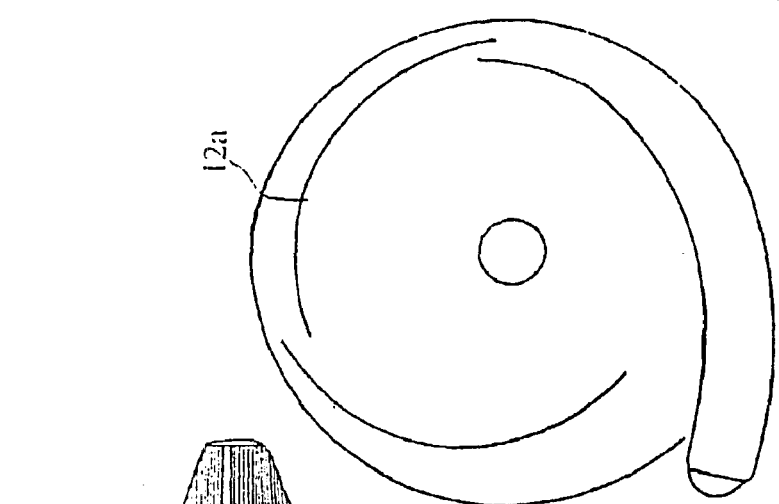
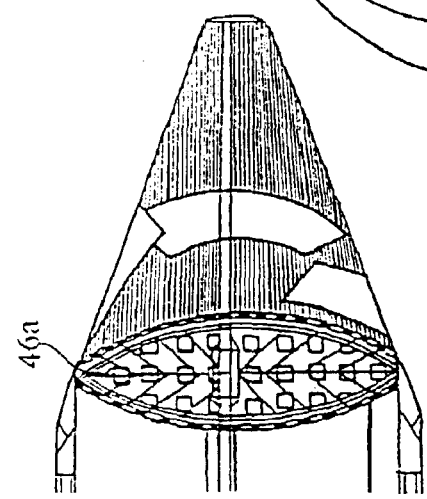
FIG. 3
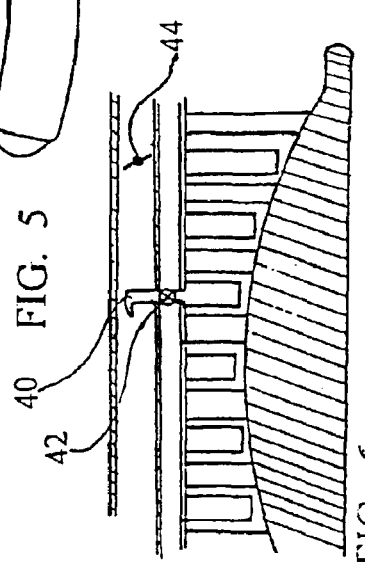
FIG. 5
FIG. 6

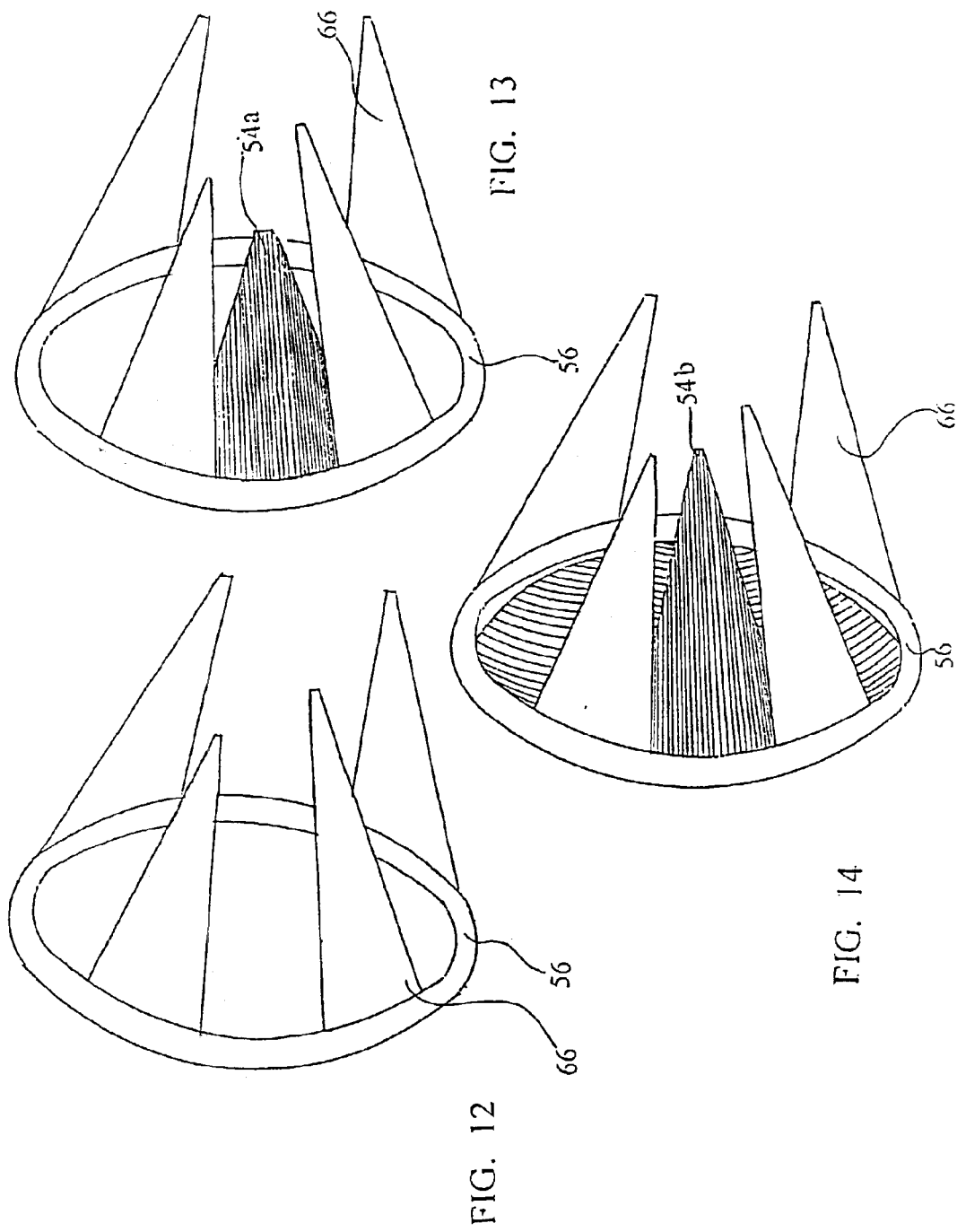

FIG. 18
FIG. 19
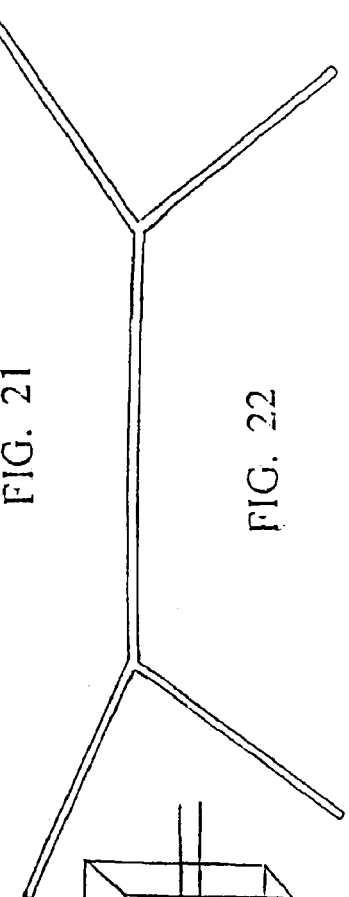
FIG. 20
FIG. 21
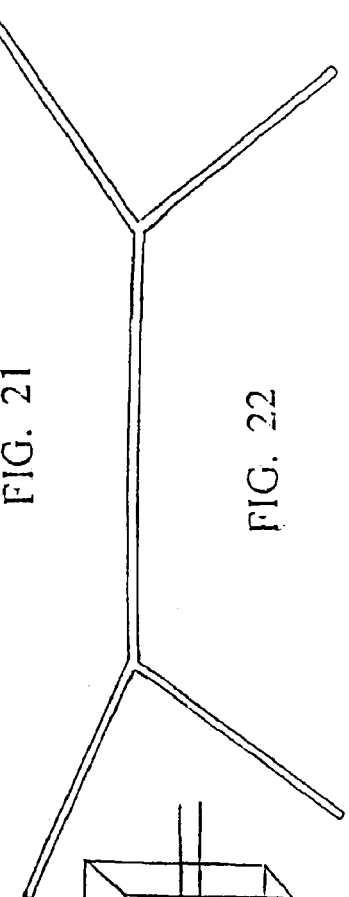
FIG. 22
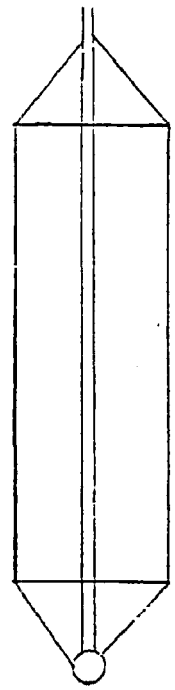
FIG. 15
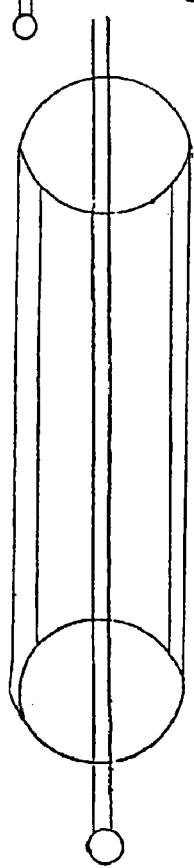
FIG. 16
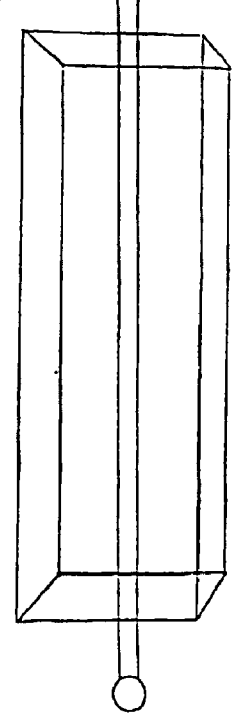
FIG. 17

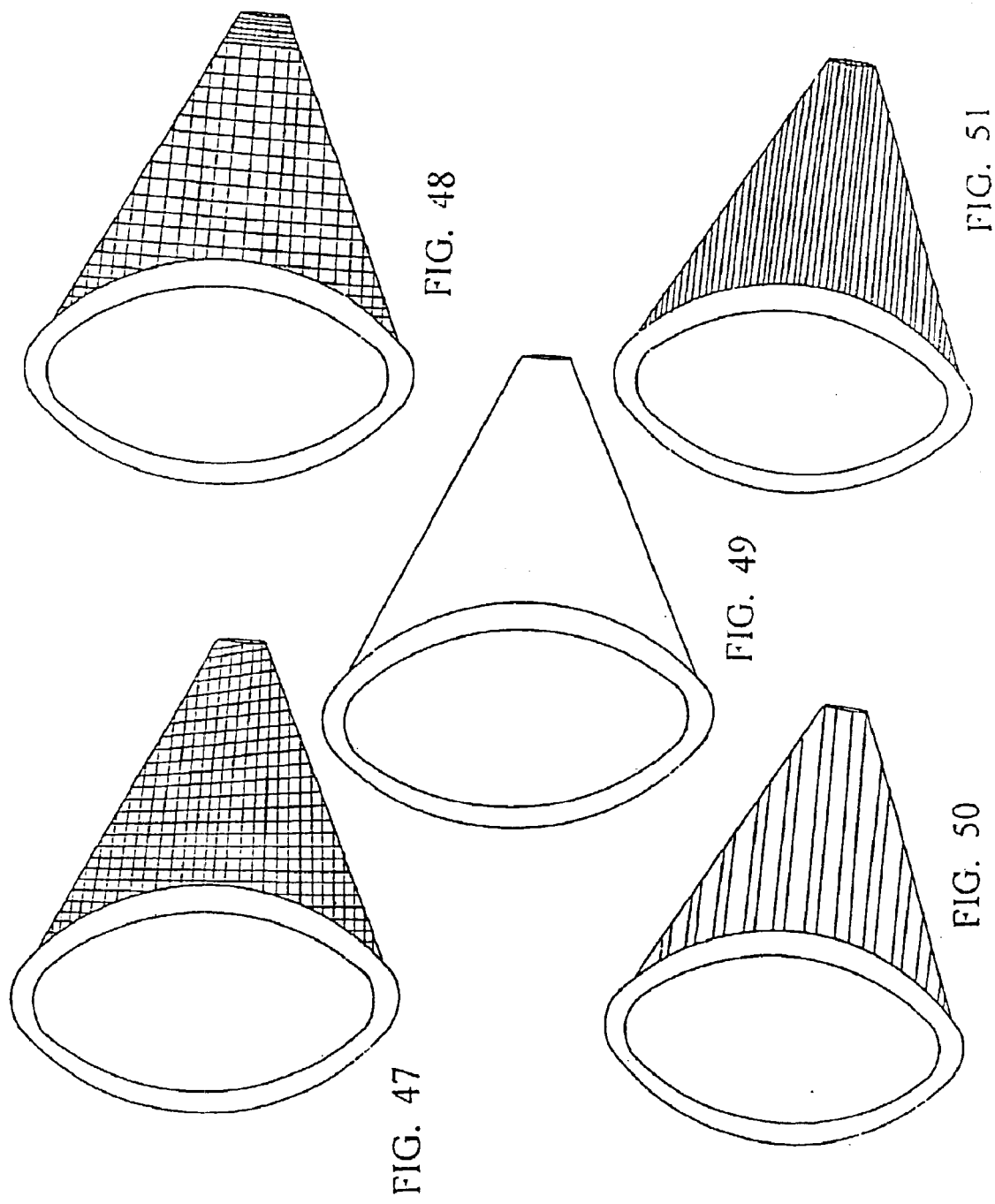

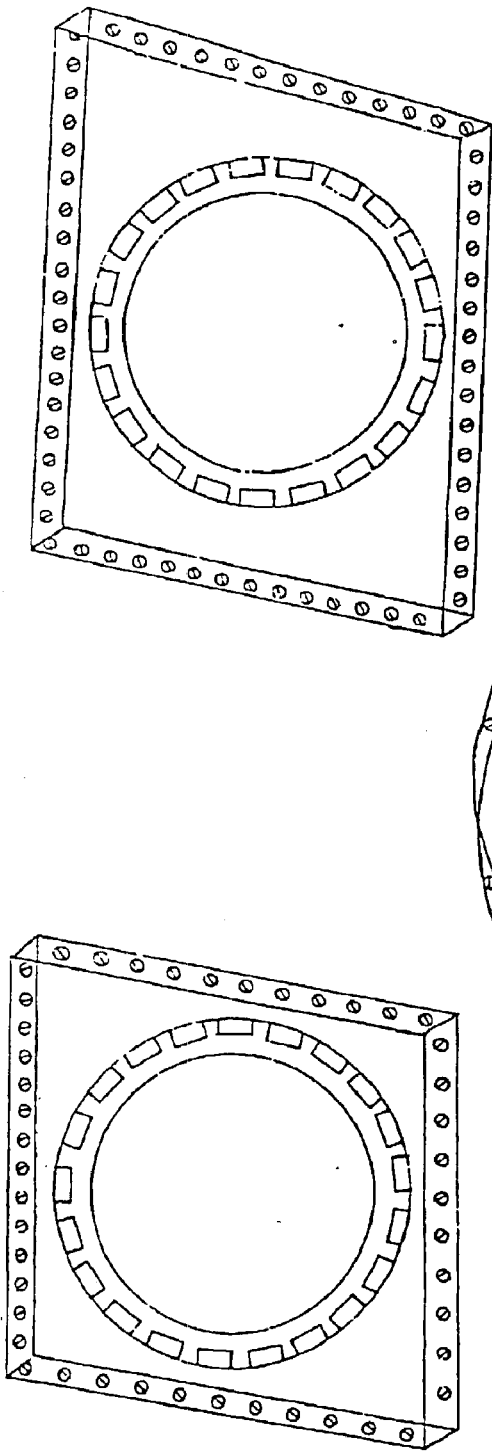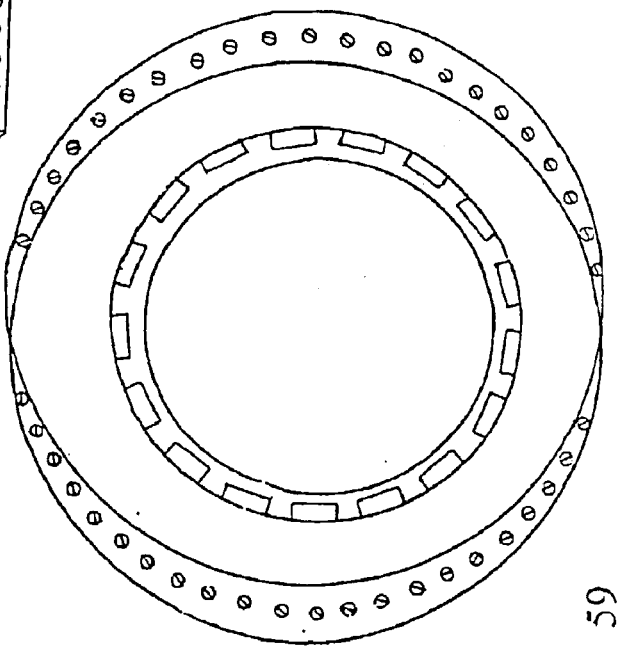
FIG. 58
FIG. 59
FIG. 57

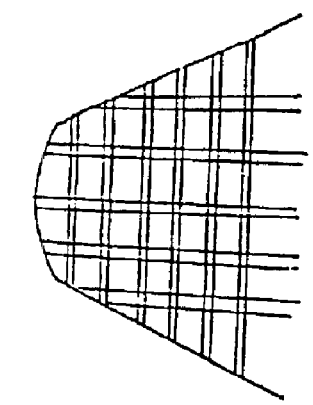
FIG. 60 FIG. 61 FIG. 62 FIG. 63
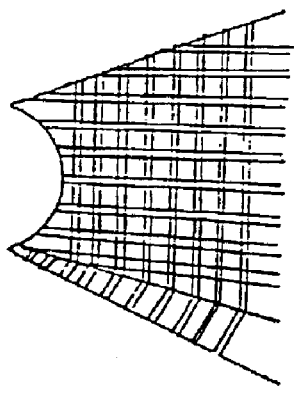
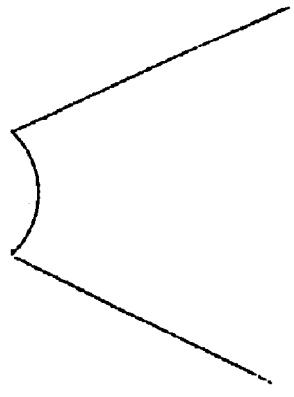
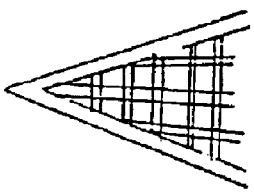
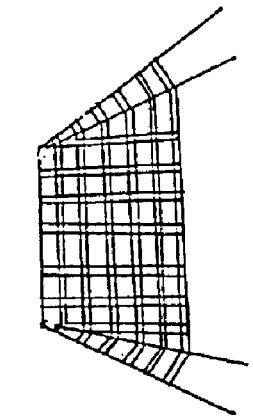
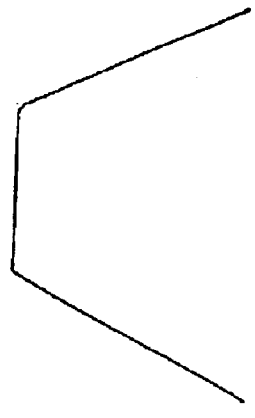
FIG. 64 FIG. 65 FIG. 66 FIG. 67

ENGINE WITH UPSTREAM AND ROTATIONALLY ATTACHED GUARD

CROSS REFERENCE TO RELATED APPLICATIONS

This application is based upon and claims the priority of U.S. Provisional Patent Application Ser. No. 60/167,163, filed on Nov. 23, 1999.

BACKGROUND OF THE INVENTION

1. Field of the Invention

The present invention relates to a system for preventing and/or separation foreign objects from the air intake of a turbine engine. In particular, this invention relates in general to a single/multiple guard(s)/cap(s) and/or screen(s) with engine shaft apparatus and/or pole. Extensions/rods can be laced, for example, fixed/secured, adhered, positioned and/or attached to the guard(s)/cap(s) and/or screen(s); as well as to the engine shaft extension(s) and/or pole apparatus, and/or rotational systems. The rotational system(s)-functions with complete, pivot and/or partial movement (for example) for gas separation, for the nacelle/air inlet of numerous jet engines, turbojet, turboprop and turboshaft engines such as aircraft and power plants or the like. The addition of the centrifuge chamber/manifold particle collector with rotational system(s) would further add security means without limiting engine thrust.

2. Description of the Prior Art

Problems are caused by ingestion of foreign objects into the nacelle/air inlet of engines; this problem has been previously known and recognized, for example, as disclosed in U.S. Pat. Nos. 2,695,074; 2,931,460; 2,944,631; 2,969,941; 3,121,545; 3,148,043; 3,426,981; 3,521,431; 3,616,616; 3,766,719; 3,832,086; 3,871,844; 4,149,689; 4,265,646; 4,617,028; 4,833,879; 5,046,458 and 5,411,224, all hereby incorporated by reference. However, such systems are known to limit engine thrust thus solving one problem and creating another. Since jet engines, turbojet, turboprop and/or turboshaft aircraft operate in environments where foreign objects cannot be controlled or removed, solutions must be found in order to solve this problem. Numerous aircraft have reported such problems with foreign objects, yet constructive solutions have not been previously found. Such problems with ingestion of foreign objects to engines causes damage in the compressor stage and to other portions of the engine. Such engine damage is immediate by partial or complete engine thrust surmounting to impairment of aircraft's flying ability. Since many of the systems used in aircraft are limited in function of engine capability, for example, two engines, such limitation can be detrimental and/or fatal. The possible injestion of foreign objects in engines during or shortly after aircraft take-off (ascending) and or aircraft landing (descent) can be grave consequence.

The advent of gas turbine helicopters and other vehicles take-off and landing with VTOL/VSTOL aircraft, foreign matter-particles are also of grave concert. Helicopters and other VTOL/VSTOL aircraft are also especially suited for certain low altitude missions on both land and sea, including combat support, search and rescue, and ant-submarine warfare; this foreign particle matter leaves the aircraft in a grave situation. Therefor, it is desirable to provide means as a guard and a particle collector for such conditions to ensure safety.

SUMMARY OF THE INVENTION

This invention relates in general to a guard(s)/cap(s) and/or screen(s) apparatus (single and/or multiple formation—along with the manipulations) for the nacelle/air inlet for numerous jet engines, turbojet, turboprop, turboshaft engines—(Helicopters and VTOL/VSTOL aircraft) such as aircraft power plants or the like. The guard(s)/cap(s) and/or screen(s) minimize if not eliminate entry of foreign objects into the nacelle/air inlet thereby allowing the function of the aircraft to operate respectively. In order for the appropriate function to occur gas separation must take place. In accordance with an important aspect of the invention, system(s) may be implemented with or without treads/threads (for example)—(along with the manipulations) that would allow the guard(s)/cap(s) and/or screen(s) to function accordingly for gas separation. The rotational system(s) and the guard(s)/cap(s) and/or screen(s), shall function with the invention of the engine shaft extension(s) attachment and/or pole apparatus (along with the manipulations). The invention of the extensions/rods from the guard(s)/cap(s) and/or screen(s) shall be fixed/secured, adhered, positioned and/or attached to the rotational system(s) and/or directly to the engine shaft extension(s) attachment and/or pole apparatus. The engine shaft extension(s) attachment and/or pole apparatus, with the extensions/rods from the guard(s)/cap(s) and/or screen(s) shall be fixed/secured, adhered and/or attached to the inward and/or outward portion of the guard(s)/cap(s) and/or screen(s)—(along with the manipulations). Extensions/rods can also be attached latitudinal/longitudinal and/or laced (for example) on the guard(s)/cap(s) and/or screen(s) of the rotational system(s). Thus adhering fixed/secured and/or positioned to the rotational system(s) and/or directly to the engine shaft extension(s) attachment and/or pole apparatus. Opening and Closure of apparatus can be attained by center axis—for example of the guard(s)/cap(s) and/or screen(s) in multiple sections (2 and/or odd numbers). Thus closure can occur upon the engine shaft attached apparatus and/or pole in a folding or laced process (for example) along with the extensions/rods. Therefore, allowing continuous motion and/or function to occur from the engine without obstruction or further automation nor limiting engine thrust.

Additional security measures are taken with the centrifuge chamber/manifold particle collector with or without ejector system(s), through conduit means. Such additional security system would ensure any doubt of foreign particle entry and destruction prior to reaching main engine components—compressor, combustor, a gas generator turbine for driving the compressor and power turbine for the driving of an output shaft. Thus, the rotational system(s) and engine-attached apparatus would ensure continuous motion and/or function to occur from the engine with further security system means without limiting engine thrust.

DESCRIPTION OF THE DRAWING

These and other advantages of the present invention will be readily understood with reference to the following specification and attached drawing wherein:

FIG. 3 shows an isometric partial expanded view of a multi vane double guards/caps and/or screens with engine attached apparatus and/or pole, with rotational systems. Centrifuge chamber/manifold particle collector-separator with shown with expanded as well as multiple extensions/rods (exhibited in the inward position towards the security apparatus);

FIG. 4 shows an isometric partial expanded view of a multi vane double guards/caps and/or screens with the engine attached apparatus and/or pole, with rotational systems. Centrifuge chamber/manifold particle collector-separator with shown with expanded as well as multiple extensions/rods (exhibited in the outward position of the security apparatus);

FIG. 5 shows a cross-sectional view of separator.

FIG. 6 shows the additional ejector system.

FIG. 7 shows the manifold sectional, engine attached apparatus and/or pole-(apparatus can be single, or attached, fixed,/secured on the engine attached apparatus and/or pole, or fixed secured on the guard(s)/cap(s) and/or screen(s). The manifold ma also include a mesh to further allow gas separation to take place.

FIG. 12 shows dispersing of a conical for retraction process; conical may take multiple forms.

FIG. 13 shows dispersing of a conical for retraction process, additional concial is exhibited which thus also can take multiple forms.

FIG. 14 shows dispersing of a conical for retraction process; additional conical may take multiple forms and vane guard thus shown in background; aperture of the vane guard shall have variance in aperture for gas separation.

FIG. 15 shows the engine shaft extension security attachment and/or pole, diamond formation (for example).

FIG. 16 shows the engine shaft extension security attachment and/or pole, cylindrical form (for example).

FIG. 17 shows the engine shaft extension security attachment and/or pole, in rectangular form (for example).

FIG. 18 shows the multiple section engine attachment for retraction process of the apparatus and/or pole.

FIG. 19 shows the multiple section engine attachment for retraction process of the apparatus and/or pole.

FIG. 20 shows longitudinal apparatus and/or pole for numerous dual inlets, with a dual extending apparatus from the pole for inlet—power plants and the like.

FIG. 21 shows longitudinal apparatus and/or pole for inlet—power plants and the like.

FIG. 22 shows longitudinal apparatus and/or pole for numerous dual inlets, with a dual extending apparatus for both sides of the pole for the inlet,—power plants and the like.

FIGS. 46a, 46b, 46c, and 46d consists in variance in meshing:
(a) is latitudinal, variance in degrees of aperture.
(b) is latitudinal and longitudinal and variance in the degrees of aperture (dense.)
(c) is longitudinal, variance in degrees of aperture.
(d) is latitudinal and longitudinal variance in degrees of aperture.

FIG. 47 the guard/cap shown as conical/cone, with multiple longitudinal and latitudinal lines/vanes form (rectangular-convex nose of the guard.

FIG. 48 the guard/cap shown as conical/cone, with multiple longitudinal and latitudinal lines/vanes form (convex nose of the guard with smaller scale of graduating metal/material or larger scale of metal/material).

FIG. 49 the guard/cap shown as conical/cone, with solid form (convex nose guard).

FIG. 50 the guard/cap shown as conical/cone, with multiple slits in longitudinal lines/vanes form (convex nose guard).

FIG. 51 the guard/cap shown as conical/cone, with multiple longitudinal lines/vanes form (convex nose guard).

FIG. 53 can also be formed with latitudinal line/vanes without being cylindrical.

FIG. 57 the rhombus structural support frame with or without internal rotational systems, with or without treads/threads-for example, the rotational system is shown in rectangular form this is one of many configurations of the structural support frame.

FIG. 58 the parallelogram structural support frame with or without internal rotational systems, with or without treads/threads-for example, the rotational system is shown in rectangular form this is one of many configurations of the structural support frame.

FIG. 59 the spherical/round structural support frame with or without internal rotational systems, with or without treads/threads-for example, the rotational system is shown in rectangular form this is one of many configurations of the structural support frame.

FIG. 60 nose guard/cap shown as conical/cone form is solid formation (cone pointed).

FIG. 61 nose guard/cap shown as conical/cone form has multiple longitudinal and latitudinal lines/vanes form (cone pointed).

FIG. 62 nose guard/cap shown as conical/cone form is solid formation (convex form).

FIG. 63 nose guard/cap shown as conical/cone form has multiple longitudinal and is latitudinal lines/vanes form (convex form).

FIG. 64 nose guard/cap shown as conical/cone form is solid formation (rectangular form).

FIG. 65 nose guard/cap shown as conical/cone form has longitudinal and latitudinal lines/vanes form (rectangular form).

FIG. 66 nose guard/cap shown as conical/cone form is solid formation (concave form).

FIG. 67 nose guard/cap shown as conical/cone form has longitudinal and latitudinal lines/vanes form (concave form).

DETAILED DESCRIPTION

Figure 1:
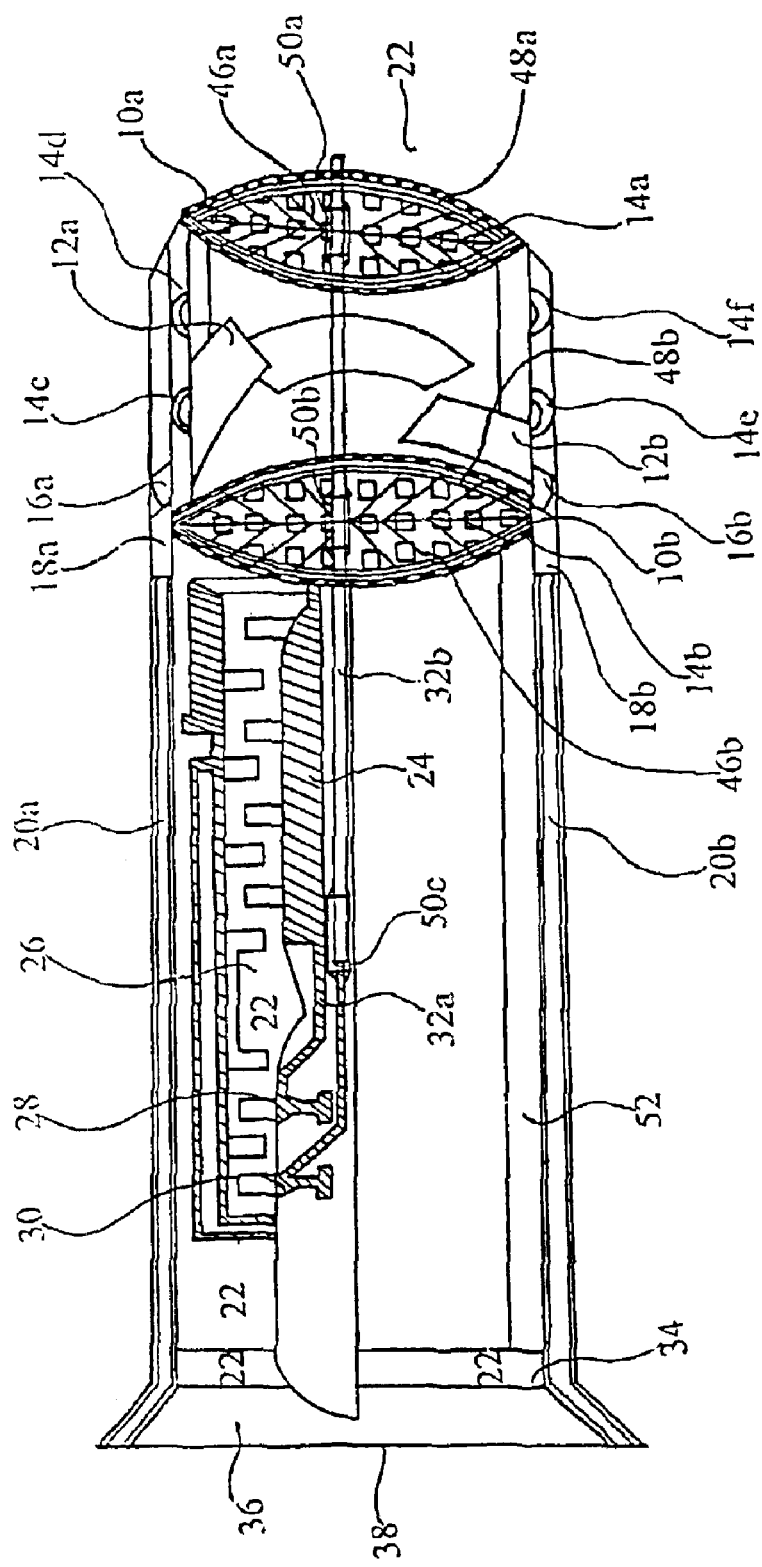
FIG. 1 shows an isometric view of double guards/caps and/or screens with engine attached apparatus and/or pole, with rotational system. Additional security by means of the centrifuge chamber/manifold particle collector-separator is with rotational system. Guard/cap and/or screen in the nacelle/air inlet according to the disclosed embodiment of the present invention.

FIG. 1 is the first embodiment exhibited in a isometric partial view of apparatus and noted that the guards/caps and/or screens (can be interchanged) is shown with longitudinal and latitudinal form. This embodiment as well as the other embodiment may consist of a dispersing effect and/or retraction. In FIG. 1 numeral 10a and 10b we note the screens, can be fixed/secured, adhered, positioned and/or attached to the bases of the apparatus (can be separate apparatus), and thus fastened. The centrifuge chamber/manifold particle collector exhibited by numerals 12a and 12b. The particle separator exhibits a pair of spaced walls-the screens-for example—(pierced screen shown as FIG. 33-can be internal part of the meshed screen(s) with vane(s)—for example-shown as FIG. 46a thru 46d) with rotational systems apparatus—exhibited by numerals 14a and 14b as well as numerals 14c and 14d, with or without treads/threads-for example. Define as annular passageway there between, having at opposite ends thereof and outlet flow of communication through two ducts exhibited by numerals 16a and 16b located at opposite ends of the chamber. The vanes in the chamber exhibited by numeral 12a and 12b axially divide the chamber and define an annular extraction manifold. The three turning vanes each of which extends an arcuate distance of approximately 120 degrees, (for example) it can to be seen that no particle need travel more than a circumferential distance of 120 degrees (for example) before entering the extraction manifold from which rebound into the engine inlet is reduced. Variances in degrees can occur with structural configuration of guard(s)/cap(s) and/or screens(s). Number of collector vanes may vary to meet the required amount for collector/separator efficiency. The ducts are in direct communication with the collection chambers exhibited by numerals 18a and 18b, and thus the collection chamber is in direct communication with the two conduits exhibited by numerals 20a and 20b. The chamber 18a, 18b may including mesh for aerodynamic purposes in various forms as discussed herein.

As air numeral 22, passes through the inlet which is at a high velocity it is turned or centrifuged circumferentially at such a downstream of the vanes, the air has both angular and axial velocity. This is known as imparting "swirl" to the fluid stream. Small particles of foreign matter entrained in the air stream are also centrifuged, having small mass the particles are carried along with the swirling air. The particles with greater mass are not of our concern due to the guard(s)/cap(s) and/or screen(s) are used for preventive measure. A particle entrained in the air stream and centrifuged will have both tangential and axial velocity downstream of the turning vanes. Both tangential and axial velocity in theory not subjected to external forces travel in a straight line path to the outer periphery of the passage way. In practice, the swirling air has significant effect on the particles trajectory which can be compared roughly to that of a helix having increasing diameter in the downstream direction (as known). Thus the centrifuging and the entrainment through the turning vanes numeral 12a and 12b and into the extraction manifold from which particles are collected through the ducts numerals 16a and 16b. The rotational systems on the chamber exhibited as numerals 14c and 14d shall additionally enable the centrifuge process to be enacted (with or without treads/threads-for example); as well as the engine shaft attached apparatus being major components.

The gaseous fluid or air shown as numeral 22 entering the engine through the inlet passes through the compressor numeral 24 where it is compressed, and hence to the combustor numeral 26 where the air is mixed with fuel and burned. The hot gases of combustion emerges at high velocity from the combustor numeral 26 and passes sequentially through the high pressure turbine numeral 28 and low pressure turbine numeral 30 where gases are expanded to extract energy there from. Energy extracted from the hot gases by turbine numeral 28 provides the driving force for the compressor numeral 24 which is connected to turbine 28 by shaft numeral 32a. Energy extracted from the hot gases by turbine numeral 30 provides the driving force for the main engine drive shaft numeral 32b which delivers power to an energy using device, such as helicopter rotor system, (not exhibited). After exiting turbine numeral 30 the hot gases of combustion passes through the engine exhaust duct numeral 34 which includes diffuser numeral 36 in which case gases are expanded and exit the engine numeral 38. This is the formal function of numerous jet engines.

Ejector systems FIG. 6 numeral 40 includes control valve FIG. 6 numeral 42 for controlling the amount of air bled from the compressor numeral 24 thus flow of the fluid through the conduits numerals 20a and 20b to increase efficiency of the gas turbine engine. When particle collector separation is not deemed necessary the ejector system may be used to interrupt the flow of bled air. A modulating valve FIG. 6 numeral 44 regulates the flow in the conduit thereby increasing engine efficiency. The guards/caps and/or screens as well as the rotational system shown in FIG. 1 numeral 10a and 10b as well as in FIG. 31 thru FIG. 56 (of metal/material) can be fastened inside the air inlet of the aircraft; as well as fastened to the nacelle exterior portion; and/or in the air inlet extending out to the nacelle. This is also held true for FIG. 59 the spherical and/or round structural support frame, with or without rotational system and/or treads/threads shown as serrated (for example). The support frame can take numerous forms such as illustrated in FIG. 57 (rhombus) and FIG. 58 (parallelogram), for example. The guards/caps and/or screens can be fixed to the guards and/or guard frame and/or as separate apparatus. Numeral 14a and 14b exhibits the rotational systems noted in rectangular form—this is one of the manipulations shown in FIG. 25. The rotational systems can be fixed to the guards cowls and/or base or as a separate apparatus (of metal/material); thus the rotational systems 14a, 14b, 14c, and 14d can be fixed/secured, adhered and/or attached to the nacelle/air inlet.

FIG. 1 numeral 46a and 46b (16 extensions/rods in each guards/caps and/or screen-for example)—can be separate apparatus-exhibits extension(s)/rod(s) which can be fixed/secured, adhered, and/or attached to the guard/cap and/or screens; as well as, can be fixed/secured, adhered and/or attached to the engine shaft apparatus and/or pole. These extensions/rods numeral 46a and 46b can extend from the inward and/or outward portion of the guards/caps and/or screens; or from the screens latitudinal vane(s) and fixed in the inward portion of the screen as exhibited (extensions/rods 46a and 46b can also be in multiples of 2/numerous in to numbers and/or odd numbers-of metal/material), are fixed/secured, positioned and/or adhered to numeral 48a and 48b, which exhibits the treads/threads of the rotational systems allowing function to occur. Extensions/Rods can also take a lacing configuration and/or a longitudinal configuration as well as having a curved aperture (for example). Thus the treads/threads (for example) of the rotational systems production of various functions and movement allows gas separation to occur—examples of movement and function is swift, pivot, clockwise (for example), time delayed, auto-mated systems and/or hydraulics (for example-and/or for opening or closure of apparatus). Numeral 32b exhibits the engine shaft extension(s) attachment and/or pole (of metal/material) thus adhered, fixed/secured and/or attached to the guards/caps, screens and/or extensions. Numeral 32a exhibits shaft from the high pressure turbine. Numeral 50a, 50b and 50c the secure/fixed, adhered, apparatus (of metal/material) attached to the engine and to the engine shaft extension(s) and/or pole-screens that allows apparatus to be secure/fixed. Therefore, also allowing the continuous motion from the engine to occur without obstruction or further automation thereby inducing motion and creating the rotation and/or function for gas separation to occur without minimizing engine thrust a higher performance engine has been created. Since the particles of matter are of small nature due to the guard(s)/cap(s) and/or screen(s) in not allowing large matter to be ingested, particles may also remain in the collection chamber(s) which can be enclosed once particles enter from the duct(s), thereby offering an additional solution to this problem. The collection chamber 18a, 18b may include a mesh as discussed above. This is a prime solution not only for numerous engines 30 jet, turoprop, turboshaft as well as for helicopters and other VTOL/VSTOL aircraft. This is a prime solution for engines and power plants and the like. Thus a guard(s)/cap(s) and/or screens along with the mechanism is significant. A casing may be added as deemed fit shown as numeral 52.

The following apparatus are various manipulations of the rotational systems (FIG. 23 thru FIG. 45—rotational systems and/or screens/guards are of metal/material and can be in numerous forms-thus for example) can be separate apparatus and/or secured/fixed, adhered and/or attached to the cowls and/or base with or without treads/threads-as well as numerous methods can be used other than treads/threads (for example). Variance in raised and or lowered in degrees of vanes, may also take a fly wheel composition FIG. 37 thru FIG. 43 allowing additional gas separation to occur and turbine motion as well as used in guards (can be used with conicals/cones). The addition of a mesh FIGS. 46a thru 46d can be used in FIG. 23 thru FIG. 45 and in other mechanisms. Devices may also be stationary for other engines and power plants and the like. All devices are independent (and may also have a curved aperture-for example) and thus can be interchanged on all apparatuses.

Figure 23:
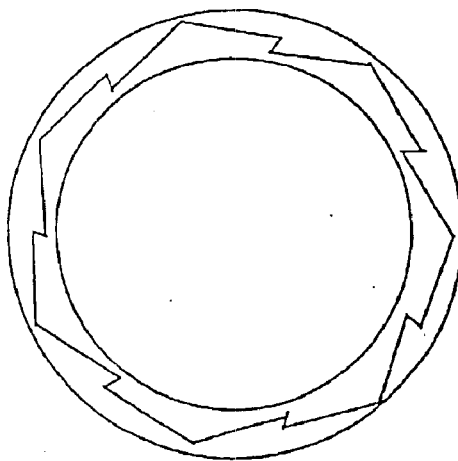
FIG. 23 rotational ring with serrated form (can also be inverted).

FIG. 23 illustrates a rotational ring with serrated form (can also be inverted) shown to adhere to the cowls and/or base, with or without treads/threads.

Figure 24:
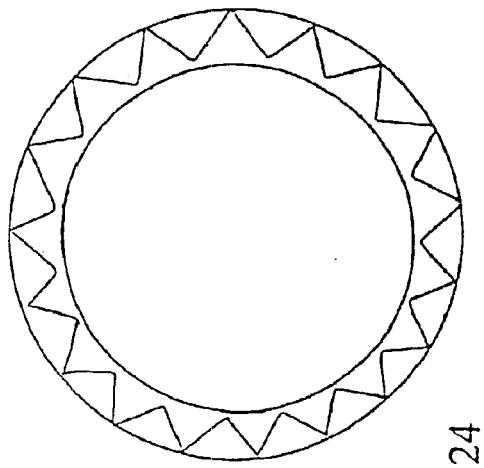
FIG. 24 rotational ring with jagged form (can also be inverted)

FIG. 24 rotational ring with jagged form (can also be inverted) shown to adhere to the cowls and/or base, with and without treads/threads.

Figure 25:
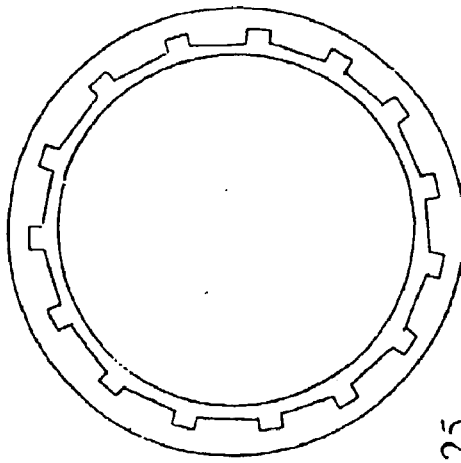
FIG. 25 rotational ring with rectangular form (can also be inverted).

FIG. 25 rotational ring with rectangular form (can also be inverted) shown to adhere to the cowls and/or base, with or without treads/threads.

Figure 26:
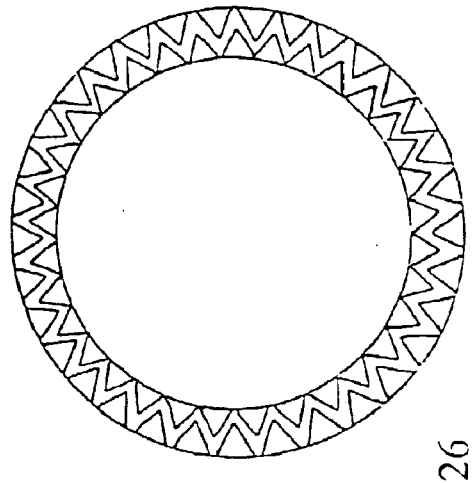
FIG. 26 rotational ring with jagged interlocked form (can also be inverted).

FIG. 26 rotational ring with jagged interlocked form (can also be inverted) shown to adhere to the cowls and/or base, with or without treads/threads.

Figure 27:
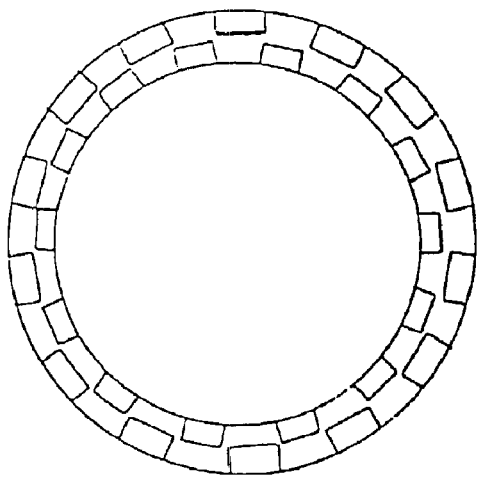
FIG. 27 rotational ring with interlocked form (can also be inverted).

FIG. 27 rotational ring with interlocked form (can also be inverted) shown to adhere to the cowls and/or base, with or without treads/threads.

Figure 28:
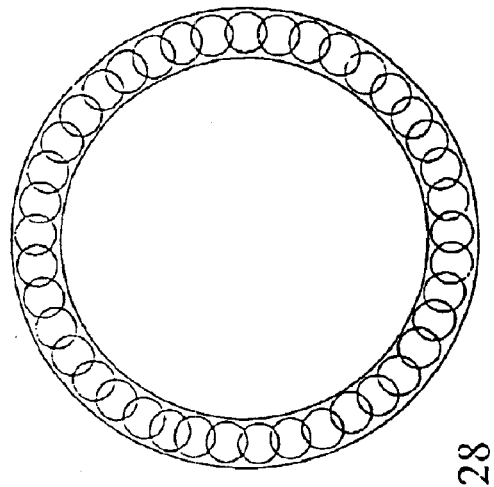
FIG. 28 rotational ring as coiled form (can also be inverted without ring but in ring formation—for example as well as numerous coils).

FIG. 28 rotational ring as coiled form (can also be inverted without ring but in ring formation-for example—as well as numerous coils) shown to adhere to the cowls and/or base, with or without treads/threads.

Figure 29:
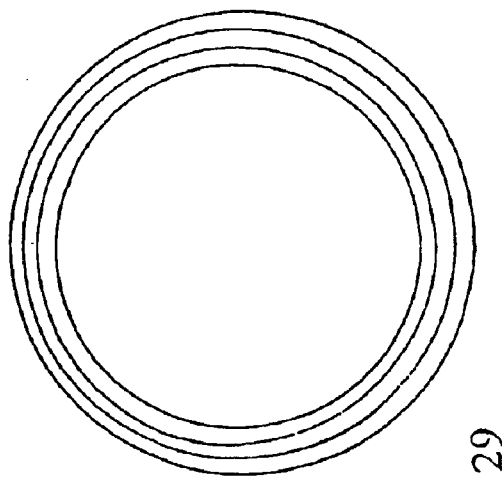
FIG. 29 rotational ring as slotted form (can also be inverted on the outside as well as internal portion of the ring—for example as well as numerous slots).

FIG. 29 rotational ring as slotted form (can also be inverted on the outside as well as internal portion of the ring—for example as well as numerous slots) shown to adhere to the cowls and/or base, with or without treads/threads.

Figure 30:
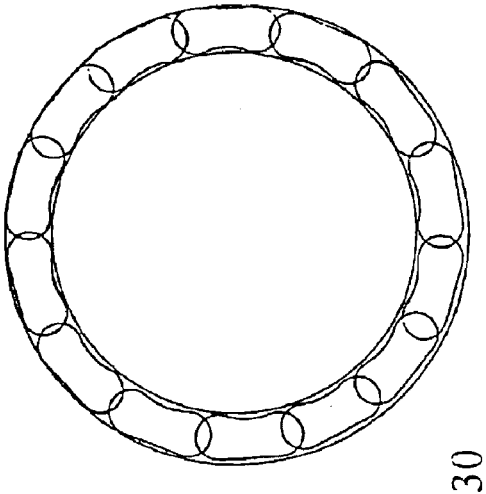
FIG. 30 rotational ring as chain linked form (can also be inverted without ring but in ring formation—for example as well as numerous links).

FIG. 30 rotational ring as chain linked form (can also be inverted without ring but in ring formation-for example as well as numerous links) shown to adhere to the cowls and/or base, with or without treads/threads.

Figure 31:
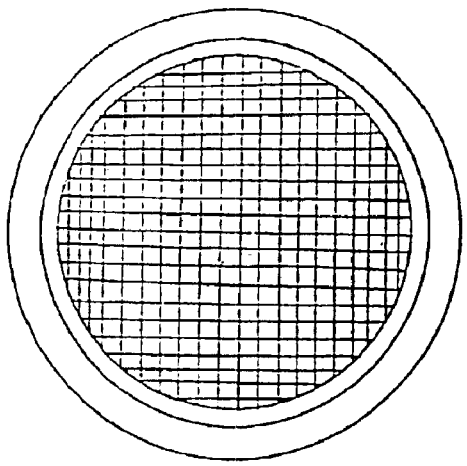
FIG. 31 rotational ring shown with screen—multiple in longitudinal and latitudinal lines/form (can also be without ring but in ring formation-for example).

FIG. 31 rotational ring shown with screen—multiple in longitudinal and latitudinal lines/form (can also be without ring but in ring formation-for example) shown to adhere to the cowls and/or base, with or without treads/threads.

Figure 32:
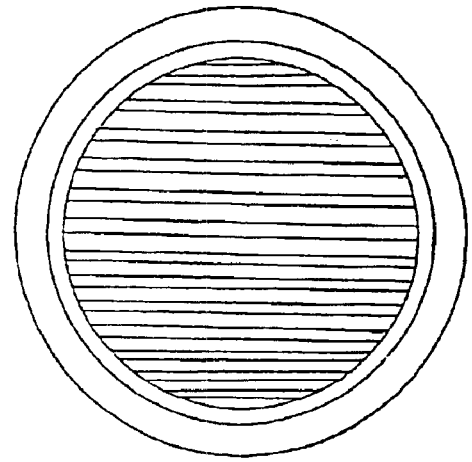
FIG. 32 rotational ring shown with screen—multiple in latitudinal lines/form (can also be without ring but in ring formation-for example).

FIG. 32 rotational ring shown with screen—multiple in latitudinal lines/form (can also be without ring but in ring formation-for example) shown to adhere to the cowls and/or base, with or without treads/threads.

Figure 33:
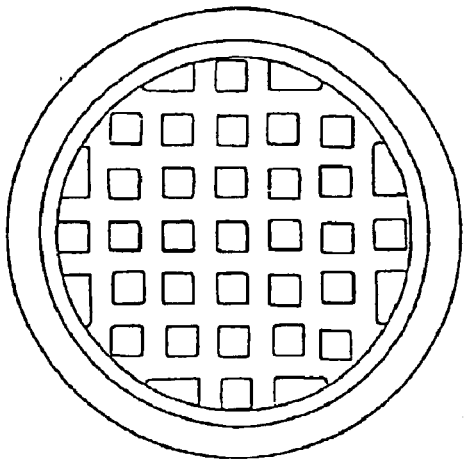
FIG. 33 rotational ring shown with screen-pierced form—multiple piercing (can also be without ring but in ring formation—for example—solid metal/material with pierced formation can also be in other forms as well as geometric-for example).

FIG. 33 rotational ring shown with screen-pierced form-multiple piercing (can also be without ring—for example—solid metal/material with pierced cube formation, can also be in other forms as well as geometric) shown to adhere to the cowls and/or base, with or without treads/threads.

Figure 34:
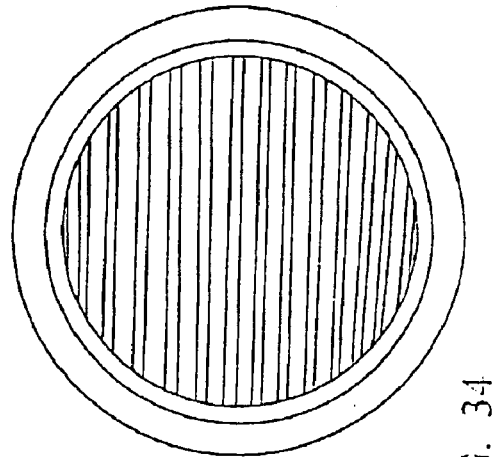
FIG. 34 rotational ring shown with screen—multiple in longitudinal lines/form (can also be without ring but in ring formation-for example).
Figure 35:
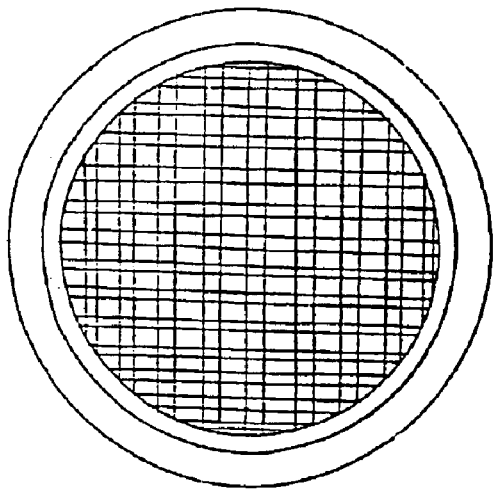
FIG. 35 rotational ring shown with screen—multiple in longitudinal and latitudinal lines/form (thicker/bolder form, can also be without ring but in ring formation-for example).

FIG. 34 rotational ring shown with screen—multiple in longitudinal lines/form (can also be without ring but in ring formation-for example) shown to adhere to the cowls and/or base, with or without treads/threads FIG. 35 rotational ring shown with screen—multiple in longitudinal and latitudinal lines/form (thicker/bolder form, can also be without ring but in ring formation-for example) shown to adhere to the cowls and/or base, with or without treads/threads.

Figure 36:
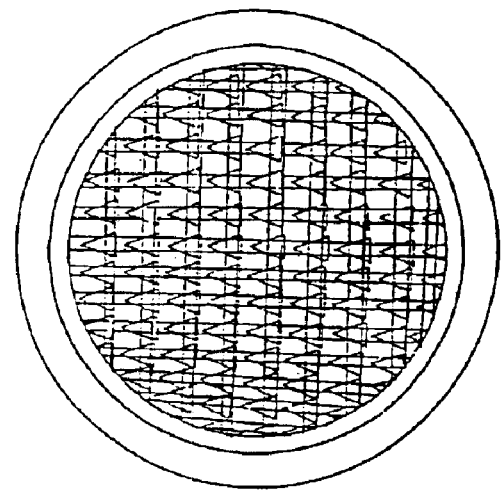
FIG. 36 rotational ring shown with screen—multiple in longitudinal and latitudinal lines/form—pierced (can also be without ring, and can be in other forms as well as geometric-for example).

FIG. 36 rotational ring shown with screen—multiple in longitudinal and latitudinal lines/form—pierced triangles (can also be without ring-for example and can be in other forms as well as geometric) shown to adhere to the cowls and/or base, with or without treads/threads.

Figure 37:
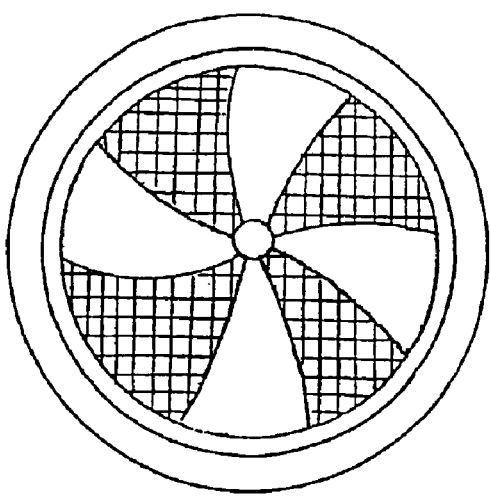
FIG. 37 rotational ring shown with screen and multiple vanes (variance raised/lowered in degrees)—screen in longitudinal and latitudinal lines/form. Multiple vanes with screen (multiples of 2 and or odd numbers). Apparatus can also be without ring but in ring formation-for example.

FIG. 37 rotational ring shown with screen and multiple vanes—screen in longitudinal and latitudinal lines/form. Multiple vanes with screen (multiples of 2 and/or odd numbers). Apparatus can also be without ring but in ring formation (for example).

Figure 38:
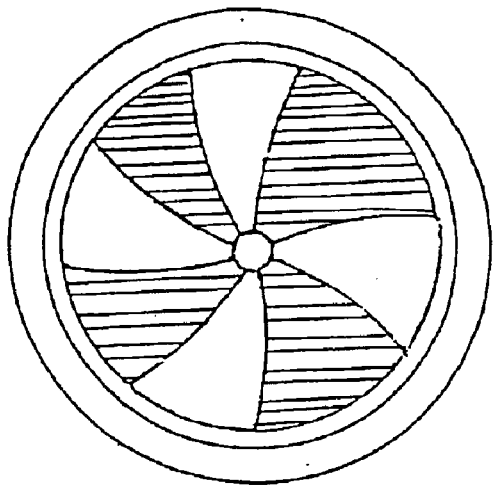
FIG. 38 rotational ring shown with screen and multiple vanes (variance raised/lowered in degrees)—screen in latitudinal lines/form. Multiple vanes with screen (multiples of 2 and/or odd numbers). Apparatus can also be without ring but in ring formation-for example.

FIG. 38 rotational ring shown with screen and multiple vanes—screen with multiple vanes—screen in latitudinal lines/form. Multiple vanes with screen (multiple of 2 and/or odd numbers). Apparatus can also be without ring but in ring formation (for example).

Figure 39:
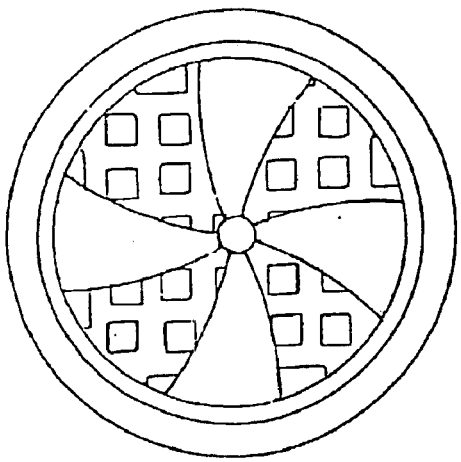
FIG. 39 rotational ring shown with screen-pierced form and multiple vanes (variance raised/lowered in degrees)-multiple piercing. Multiple vanes with screen (multiples of 2 and/or odd numbers). Apparatus can also be without ring but in ring formation (solid metal/material with pierced formation, can also be in other forms as well as geometric-for example).

FIG. 39 rotational ring shown with screen-pierced form and multiple vanes—multiple cube piercing. Multiple vanes with screen (multiples of 2 and/or odd numbers). Apparatus can also be without ring but in ring formation-for example (solid metal/material with pierced formation, can also be in other forms as well as geometric)-for example. FIG. 46a thru 46d shown as the internal mesh for pierced mechanism; this mesh can also be used in other mechanisms and/or manipulations.

Figure 40:
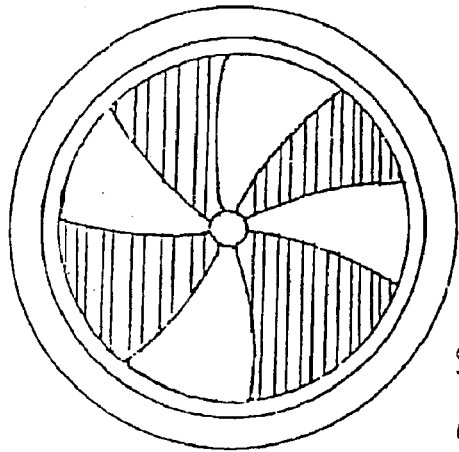
FIG. 40 rotational ring shown with screen and multiple vanes (variance raised/lowered in degrees) screen longitudinal lines/form. Multiple vanes with screen (multiples of 2 and/or odd numbers). Apparatus can also be without ring but in ring formation-for example.

FIG. 40 rotational ring shown with screen and multiple vanes—screen in longitudinal lines/form. Multiple vanes with screen (multiples of 2 and/or odd numbers). Apparatus can also be without ring but in ring formation (for example).

Figure 41:
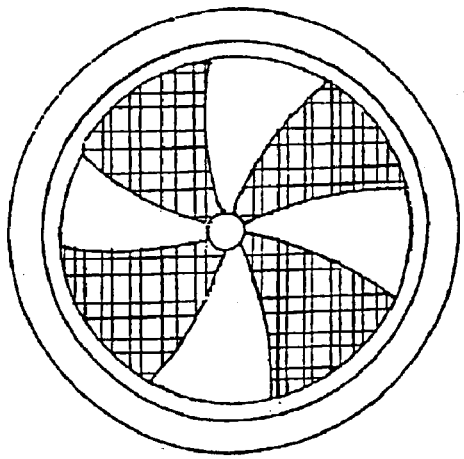
FIG. 41 rotational ring shown with screen and multiple vanes (variance raised/lowered in degrees)—screen in longitudinal and latitudinal lines/form (thicker/bolder form). Multiple vanes with screen (multiples of 2 and/or odd numbers). Apparatus can also be without ring but in ring formation-for example.

FIG. 41 rotational ring shown with screen and multiple vanes—screen in longitudinal and latitudinal lines/form (thicker/bolder form). Multiple vanes with screen (multiples of 2 and/or odd numbers). Apparatus can also be without ring but in ring formation (for example).

Figure 42:
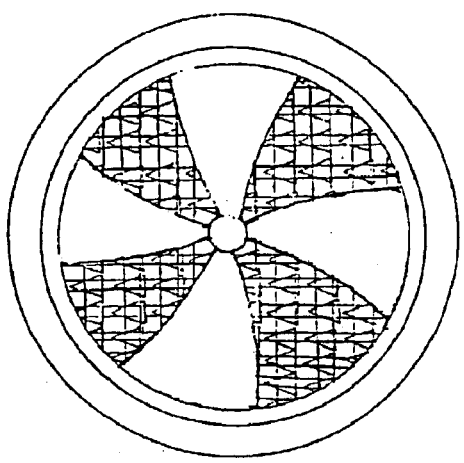
FIG. 42 rotational ring shown with screen and multiple vanes (variance raised/lowered in degrees)—screen in longitudinal and latitudinal lines/form-pierced (can be in other forms as well as geometric). Multiple vanes with screen (multiples of 2 and/or odd numbers). Apparatus can also be without ring but in ring formation-for example.

FIG. 42 rotational ring shown with screen and multiple vanes—screen in longitudinal and latitudinal lines/form-pierced triangular form (can be in other forms as well as geometric). Multiple vanes with screen (multiples of 2 and/or odd numbers). Apparatus can also be without ring but in ring formation (for example).

Figure 43:
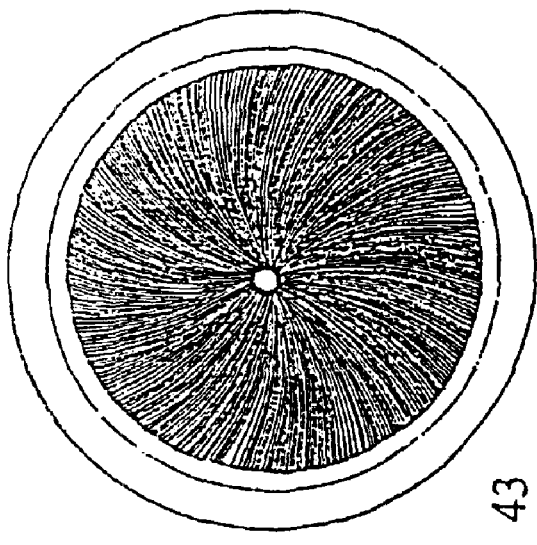
FIG. 43 rotational ring shown with screen—screen consists of multiple vanes (variance raised/lowered in degrees), with or without treads/threads-for example.
Figure 46A:
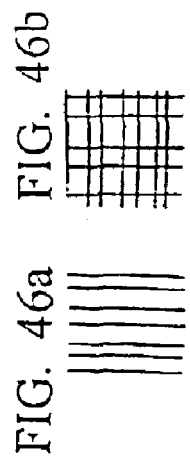
FIG. 46a-46d shown as internal mesh for the pierced mechanism; this can also be used for numerous functions in accordance to the mechanism.
Figure 46B:
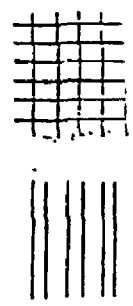
Figure 46C:
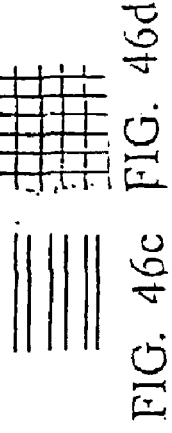
Figure 46D:
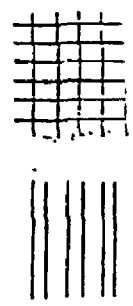

FIG. 43 rotational ring shown with screen and multiple vanes. Multiples of vanes 2 and/or odd numbers. Apparatus can also be without ring but in ring formation (for example).

Figure 44:
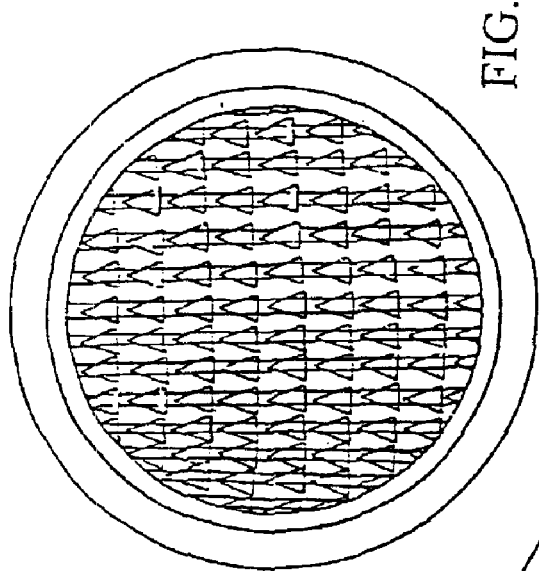
FIG. 44 rotational ring shown with screen—screen in longitudinal and latitudinal lines/form pierced (can be in other forms as well as geometric).

FIG. 44 rotational shown with screen—screen in longitudinal and latitudinal lines/form pierced triangular form (can be in other forms as well as geometric compositions).

Figure 45:
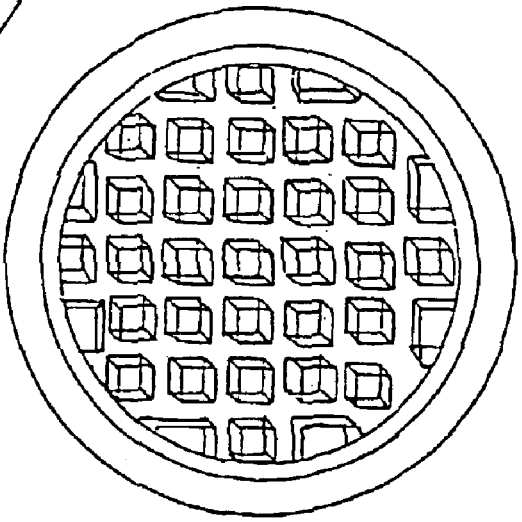
FIG. 45 rotational ring shown in cube form with height, width, and depth—multiple cubes (can also be without ring but in ring formation—for example—solid metal/material with or without cubes consisting a mesh, in multiples of 2 and/or odd numbers. Note: cube can take other geometric forms.

FIG. 45 rotational ring shown in cube form with height, width, and depth—multiple cubes (can also be without ring but in ring formation—for example—solid metal/material that may have cubes consisting of a internal, side and/or bottom mesh in multiples of 2 and/or odd numbers-for example. Note: cube can take other geometric forms.

FIGS. 46a, 46b, 46c and 46d consists in variance in meshing:

(a) is latitudinal, variance in degree of aperture.

(b) is latitudinal and longitudinal and variance in degrees of aperture (dense).

(c) is longitudinal variance in degree of aperture.

(d) is latitudinal and longitudinal variance in degrees of aperture.

The following apparatus are various manipulations of the guards/caps with conical/cones (apparatus can be independent), shown with cowls and/or base can be fixed/secured, adhered and/or attached; thus by being fixed/secured, adhered, and/or attached to the rotational rings (apparatus can be separate) of FIG. 1 numerals 14a and 14b with or without treads/threads. Extensions/Rods FIG. 1 numerals 46a and 46b (apparatus can be independent and may have a curved aperture), can be fixed/secured, adhered, positioned and/or attached to the guards/caps and/or screens; as well as to the engine shaft extension attachment and/or pole, and/or rotational systems apparatus. All guard/cap noses can be convex/concave, pointed and solid (for example) as well as other manipulations listed (apparatus independently and/or whole can be of metal/material):

FIG. 47 the guard/cap shown as conical/cone, with multiple longitudinal and latitudinal lines/vanes form (rectangular-convex nose of the guard) shown to adhere to the cowls and/or base, as well as adhering to the rotational rings numerals 14a and 14b with or without treads/threads; thus can be applied to FIG. 23 thru FIG. 45, 57, 58 and 59 respectively.

FIG. 48 the guard/cap shown as conical/cone, with multiple longitudinal and latitudinal lines/vanes form (convex nose of the guard with smaller scale of graduating metal/material or larger scale of metal/material-the nose of the guard/cap can be interchanged with other manipulations) shown to adhere to the cowls and/or base, as well as adhering to the rotational rings numerals 14a and 14b with or without treads/threads; thus can be applied to FIG. 23 thru FIG. 45, 57, 58 and 59 respectively.

FIG. 49 the guard/cap shown as conical/cone, solid form (convex nose guard) shown to adhere to the cowls and/or base, as well as adhering to the rotational rings numeral 14a and 14b with or without treads/threads; thus can be applied to FIG. 23 thru FIG. 45, 57, 58, and 59 respectively.

FIG. 50 the guard/cap shown as conical/cone, with multiple longitudinal lines/vanes form (convex nose guard) shown to adhere to the cowls and/or base, as well as adhering to the rotational rings numeral 14a and 14b with or without treads/threads; thus can be applied to FIG. 23 thru FIG. 45, 57, 58 and 59 respectively. Not shown, although deemed fit is the conical/cone, with multiple latitudinal lines/vanes form (convex nose guard) thus can adhere to the cowls and/or base, as well as adhering to the rotational rings numeral 14a and 14b with or without treads/threads; thus can be applied to FIG. 23 thru FIG. 45,57, 58 and 59 respectively.

FIG. 51 the guard/cap shown as conical/cone, with multiple longitudinal lines/vanes form (convex nose guard) shown to adhere to the cowls and/or base, as well as adhering to the rotational rings numerals 14a and 14b with or without treads/threads; thus can be applied to FIG. 23 thru FIG. 45, 57, 58 and 59 respectively.

Figure 52:
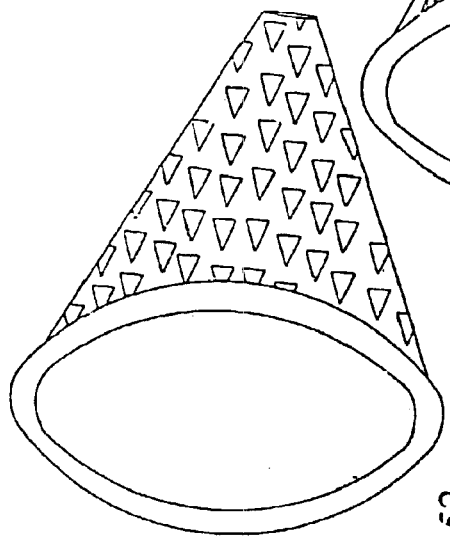
FIG. 52 the guard/cap shown as conical/cone, pierced form—multiple in piercing (convex nose guard can also be in other forms as well as geometric).

FIG. 52 the guard/cap shown as conical/cone, pierced triangular form—multiple in piercing (convex nose guard, can be various patterns of piercing) shown to adhere to the cowls and/or base, as well as adhering to the rotational rings numerals 14a and 14b with or without treads/threads; thus can be applied to FIG. 23 thru FIG. 45, 57, 58 and 59 respectively.

Figure 53:
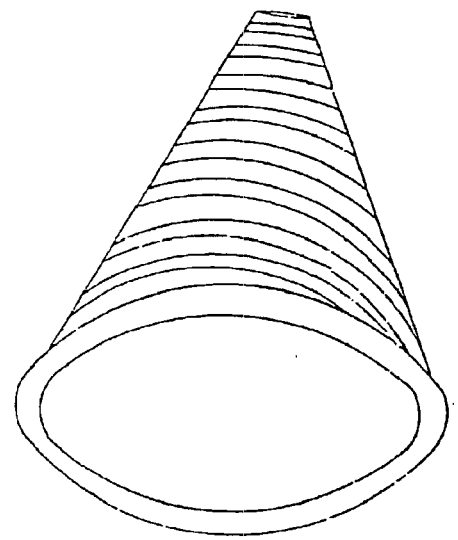
FIG. 53 the guard/cap shown as conical/cone, with multiple latitudinal line/vanes form (convex nose and/or guard with nose guard with cylindrical latitude form).

FIG. 53 the guard/cap shown as conical/cone, with multiple latitudinal lines/vanes form (convex nose guard with nose guard and/or with cylindrical latitude form as conical/cone) shown to adhere to the cowls and/or base, as well as adhering to the rotational rings numerals 14a and 14b with or without treads/threads; thus can be applied to FIG. 23 thru FIG. 45, 57, 58 and 59 respectively. Note, conical/cone may also take a latitudinal line/vanes.

Figure 54:
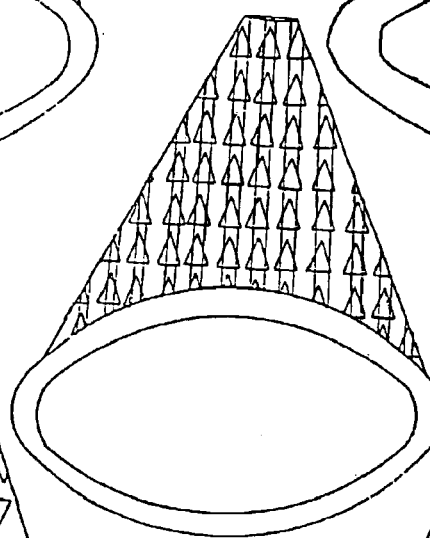
FIG. 54 the guard/cap shown as conical/cone, pierced form—multiple in piercing as well as longitudinal lines/vanes form (convex nose can also be in other forms-latitudinal lines may also be added for additional obstruction.

FIG. 54 the guard/cap shown as conical/cone pierced triangular form-multiple piercing as well as longitudinal form (convex nose can also be in other forms-with the addition of latitudinal lines/vanes may offer additional obstruction shown to adhere to the cowls and/or base, as well as adhering to the rotational rings numerals 14a and 14b with or without treads/threads; thus can be applied to FIG. 23 thru FIGS. 45, 57 58 and 59 respectively.

Figure 55:
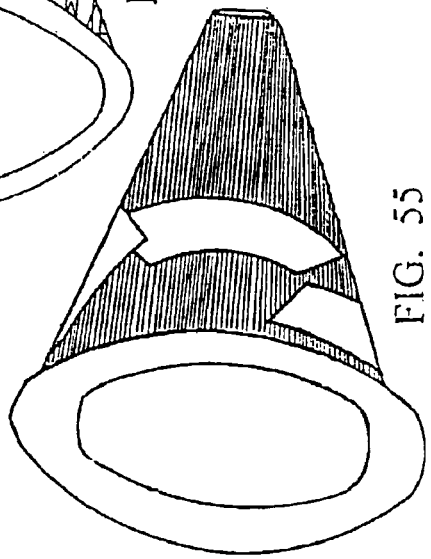
FIG. 55 the guard/cap shown as conical/cone, with multiple longitudinal lines/vanes for greater gas separation with external centrifuge manifold particle collector-separator.

FIG. 55 the guard/cap shown as conical/cone with multiple longitudinal lines/vanes (convex nose guard) and centrifuge process on the exterior of the conical/cone thus offering centrifuging process by turning vanes each extending an arcuate distance of approximately 120 degrees, (for example), shown to adhere to the cowls and/or base, as well as adhering to the rotational ring numerals 14a and 14b with or without treads/threads; thus can be applied to FIG. 23 thru FIGS. 45, 57, 58 and 59 respectively. Note: conical/cone may also take a latitudinal lines/vanes—not shown.

Figure 56:
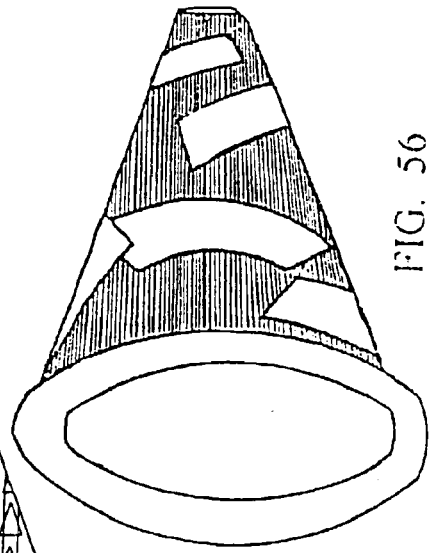
FIG. 56 the conical with multiple external vanes (vane variance raised and/or lowered in degrees)—solid and/or partial form (for example).

FIG. 56 the guard/cap shown as conical/cone with multiple longitudinal lines/vanes (convex nose guard) with exterior of a series of turning vanes each extending an arcuate distance of approximately 120 degrees—for example (degrees may vary depending on how may vanes are added to the conical/cone); shown to adhere to the cowls and/or base, as well as adhering to the rotational ring numerals 14a and 14b with or without treads/threads; thus can be applied to FIG. 23 thru FIGS. 45, 57, 58 and 59 respectively. This conical is prime for deflecting shrapnel and thus returning shrapnel to the enemy without causing obstruction to engine components and yet offer maximization of gas separation. Note; conical/cone may also take a latitudinal lines/vanes-not shown.

The following device is the "Structural Support Frame System," if for numerous jets, turboprop, turboshaft, and other VTOL/VSTOL as well as engines and power plants and the like; with or without rotational system as well as with or without treads/threads (for example). Rotational system may be within the structural support frame and/or prior to the structural support fame and/or henceforth after. Possible inclusion, of the guard(s)/cap(s) and/or screen(s) with the "Structural Support Frame System."

FIG. 57 the structural support frame system shown in rhombus form with rectangular rotational system shown as FIG. 25, can be fixed/secured, adhered, and/or attached inside the air inlet of the aircraft, as well as fastened to the nacelle exterior portion, and/or in the air inlet extending out the nacelle (of metal/material).

FIG. 58 the structural support frame system shown in parallelogram form with rectangular rotational system shown as FIG. 25 can be fixed/secured, adhered, and/or attached inside the air inlet of the aircraft as well as fastened to the nacelle exterior portion, and/or in the air inlet extending out the nacelle (of metal/material).

FIG. 59 the structural support frame system shown in spherical and/or round form with rectangular rotational system shown as FIG. 25 can be fixed/secured, adhered, and/or attached inside the air inlet of the aircraft as well as fastened to the nacelle exterior portion, and/or in the air inlet extending out to the nacelle (of metal/material).

The following apparatus are nose guards/caps shown in conical/cone form with various interchanging nose guard/cap-may take the configuration of convex, concave and/or solid-for example. All nose guards are independent and thus can be applicable and interchangeable on all conicals/cones. The following are manipulations of the conical/cones nose guards/caps:

FIG. 60 nose guard/cap shown as conical/cone form is solid formation (cone pointed). Such nose guard/cap can be solid in whole and/or partial and in kind.

FIG. 61 nose guard/cap shown as conical/cone form has multiple longitudinal and latitudinal lines/vanes form (cone pointed). Such a nose guard/cap can be solid in whole and/or partial and in kind.

FIG. 62 nose guard/cap shown as conical/cone form is solid formation (convex form). Such a nose guard/cap shown can be solid in whole and/or partial and in kind.

FIG. 63 nose guard/cap shown as conical/cone form has multiple longitudinal and latitudinal lines/vanes form (convex form). Such a nose guard/cap shown can be solid in whole and/or partial and in kind.

FIG. 64 nose guard/cap shown as conical/cone form is solid formation (rectangular form). Such a nose guard/cap shown can be solid in whole and/or partial and in kind.

FIG. 65 nose guard/cap shown as conical/cone form has longitudinal and latitudinal lines/vanes form (rectangular form). Such a nose guard/cap shown can be solid in whole and/or partial and in kind.

FIG. 66 nose guard/cap shown as conical/cone form is solid formation (concave form). Such a nose guard/cap shown can be solid in whole and/or partial and in kind.

FIG. 67 nose guard/cap shown conical/cone form has longitudinal and latitudinal lines/vanes form (concave form). Such a nose guard/cap can be solid in whole and/or partial and in kind.

Figure 2:
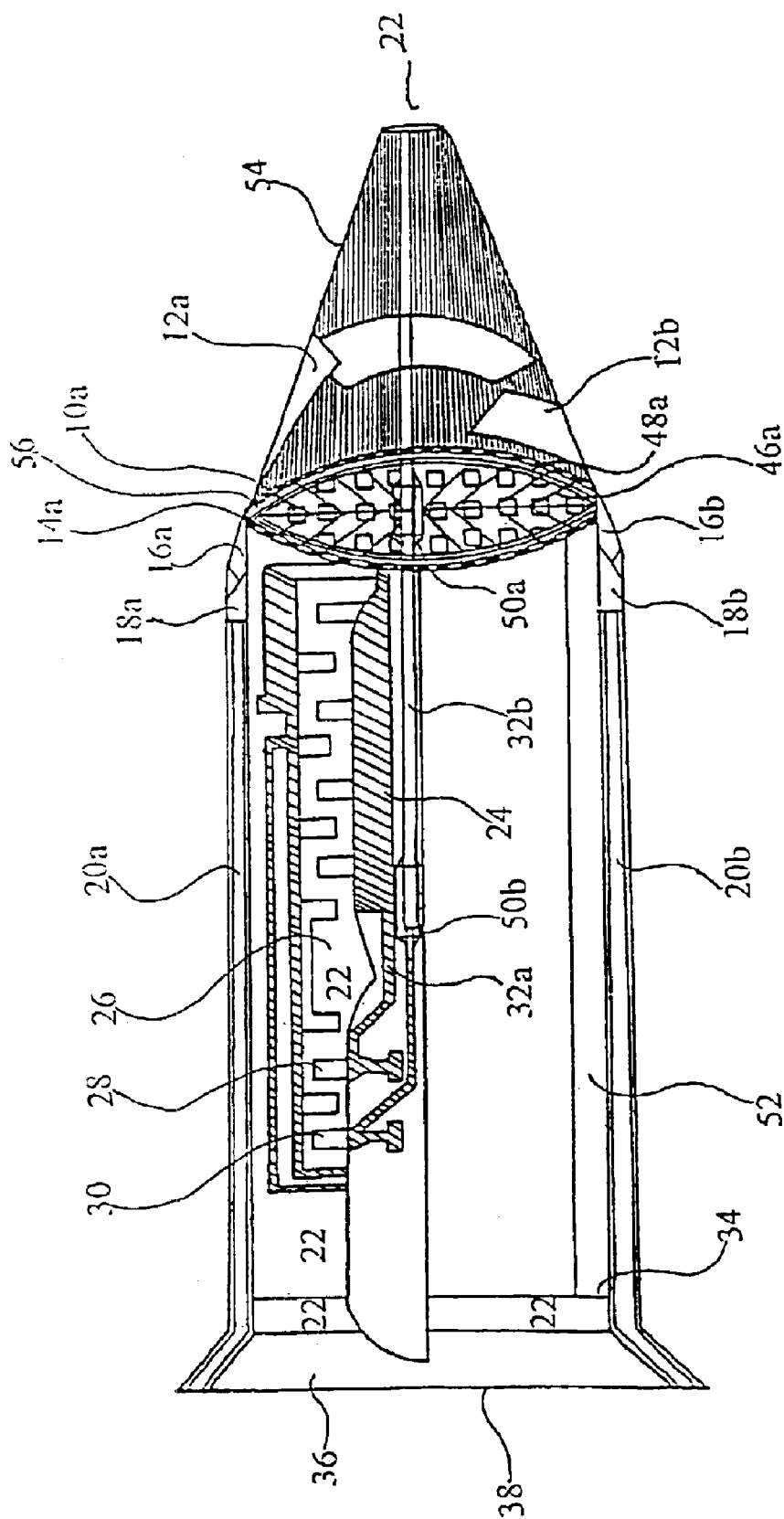
FIG. 2 shows an isometric view of the double guards/caps and/or screens with engine attached apparatus and/or pole, with rotational system. Centrifuge chamber/manifold particle collector-separator with the exhibited within the multi vane conical.

FIG. 2 illustrates an alternate embodiment exhibited in a isometric partial view of apparatus and illustrates that the guards/caps and/or screens (can be interchanged) is shown with longitudinal and latitudinal form. In FIG. 2 numeral 10a the screens, can be fixed/secured, adhered, positioned and/or attached to the bases of the apparatus (can be separate apparatus), and thus fastened. The centrifuge chamber/manifold particle collector exhibited by numerals 12a and 12b. The particle separator exhibits a pair of spaced walls-within the conical/con-for example—(pierced screen shown as FIG. 33—can be internal part of the meshed screen(s) with vane(s)—for example-shown as FIGS. 46a thru 46d) with rotational systems apparatus—exhibited by numerals 14a with or without treads/threads-for example. Define as annular passageway there between, having at opposite ends thereof and outlet flow of communication through two ducts exhibited by numerals 16a and 16b located at opposite ends of the chamber. The vanes in the chamber exhibited by numeral 12a and 12b axially divide the chamber and define an annular extraction manifold within the conical/cone. The three turning vanes each of which extends an arcuate distance of approximately 120 degrees, (for example) it can be seen that no particle need travel more than a circumferential distance of 120 degrees (for example) before entering the extraction manifold from which rebound into the engine inlet is reduced. Variances in degrees can occur with structural configuration of guard(s)/cap(s) and/or screens(s). Number of collector vanes may vary to meet the required amount for collector/separator efficiency. The ducts are in direct communication with the collection chambers exhibited by numerals 18a and 18b, and thus the collection chamber is in direct communication with the two conduits exhibited by numerals 20a and 20b. As air numeral 22, passes through the inlet which is at a high velocity it is turned or centrifuged circumferentially at such a downstream of the vanes, the air has both angular and axial velocity. This is known as imparting "swirl" to the fluid stream. Small particles of foreign matter entrained in the air stream are also centrifuged, having small mass the particles are carried along with the swirling air. The particles with greater mass are not of our concern due to the guard(s)/cap(s) and/or screen(s) are used for preventive measure. A particle entrained in the air stream and centrifuged will have both tangential and axial velocity downstream of the turning vanes. Both tangential and axial velocity in theory not subjected to external forces travel in a straight line path to the outer periphery of the passage way. In practice, the swirling air has significant effect on the particles trajectory which can be compared roughly to that of a helix having increasing diameter in the downstream direction (as known). Thus the centrifuging and the entrainment through the turning vanes numeral 12a and 12b into the extraction manifold from which particles are collected through the ducts numerals 16a and 16b. The engine shaft attached apparatus numeral 32b is thus being major a component in allowing auto induced function for the rotational and centrifuge process to occur within the conical/cone. The gaseous fluid or air shown as numeral 22 entering the engine through the inlet passes through the compressor numeral 24 where it is compressed, and hence to the combustor numeral 26 where the air is mixed with fuel and burned. The hot gases of combustion emerges at high velocity from the combustor numeral 26 and passes sequentially through the high pressure turbine numeral 28 and low pressure turbine numeral 30 where gases are expanded to extract energy there from. Energy extracted from the hot gases by turbine numeral 28 provides the driving force for the compressor numeral 24 which is connected to turbine 28 by shaft numeral 32a. Energy extracted from the hot gases by turbine numeral 30 provides the driving force for the main engine drive shaft numeral 32b which delivers power to an energy using device, such as helicopter rotor system, (not exhibited). After exiting turbine numeral 30 the hot gases of combustion passes through the engine exhaust duct numeral 34 which includes diffuser numeral 36 in which case gases are expanded and exit the engine numeral 38. This is the formal function of numerous jet engines. Ejector systems FIG. 6 numeral 40 includes control valve FIG. 6 numeral 42 for controlling the amount of air bled from the compressor numeral 24 thus flow of the fluid through the conduits numerals 20a and 20b to increase efficiency of the gas turbine engine. When particle collector separation is not deemed necessary the ejector system may be used to interrupt the flow of bled air. A modulating valve FIG. 6 numeral 44 regulates the flow in the conduit thereby increasing engine efficiency. The guards/caps and/or screens as well as the rotational system shown in FIG. 2 numeral 10a as well as in FIG. 31 thru FIG. 56 (of metal/material) can be fastened inside the air inlet of the aircraft; as well as fastened to the nacelle exterior portion; and/or in the air inlet extending out to the nacelle. This is also held true for FIG. 59 the spherical and/or round structural support frame, with or without rotational system and/or treads/threads shown as serrated (for example). The support frame can take numerous forms such as FIG. 57 rhombus and FIG. 58 parallelogram (for example). The guards/caps and/or screens can be fixed to the guards and/or guard frame and/or as separate apparatus. Numeral 14a exhibits the rotational systems noted in rectangular form—this is one of the manipulations shown in FIG. 25. The rotational systems can be fixed to the guards cowls and/or base or as a separate apparatus (of metal/material); thus to the rotational systems 14a, can be fixed/secured, adhered and/or attached to the nacelle/air inlet. FIG. 2 numeral 46a (16 extensions/rods in the guards/caps and/or screen-for example)-can be separate apparatus-exhibits extension(s)/rod(s) which can be fixed/secured, adhered, and/or attached to the guard/cap and/or screens; as well as, can be fixed/secured, adhered and/or attached to the engine shaft apparatus and/or pole apparatus. These extensions/rods numeral 46a and 46b can extend from the inward and/or outward portion of the guards/caps and/or screens; or from the screens latitudinal vane(s) and fixed in the inward portion of the screen as exhibited (extensions/rods 46a can also be in multiples of 2/numerous in numbers and/or odd numbers-of metal/material), arc fixed/secured, positioned and/or adhered to numeral 48a, which exhibits the treads/threads of the rotational systems allowing function to occur. Extensions/Rods can also take a lacing configuration and/or a longitudinal configuration as well as a curved aperture (for example). Thus inventing treads/threads (for example) of the rotational systems production of various functions and movement shall therefore allow gas separation to occur—examples of movement and function is swift, pivot, clockwise (for example), time delayed, automated systems and/or hydraulics (for example-and/or for opening or closure of apparatus). Numeral 32b exhibits the engine shaft extension(s) attachment and/or pole (of metal/material) thus adhered, fixed/secured and/or attached to the guards/caps, screens and/or extensions. Numeral 32a exhibits shaft from the high pressure turbine. Numeral 50a, the secure/fixed, adhered, apparatus (of metal/material) attached to the engine and to the engine shaft apparatus and/or pole-screens that allows apparatus to be secure/fixed. Therefore, also allowing the continuous motion from the engine to occur without obstruction or further automation thereby inducing motion and creating the rotation and/or function for gas separation to occur without minimizing engine thrust we have created a higher performance engine. Note: Since the particles of matter are of small nature due to the guard(s)/cap(s) and/or screen(s) in not allowing large matter to be ingested, particles may also remain in the collection chamber(s) which can be enclosed once particles enter from the duct(s), thereby offering an additional solution to this problem. This is a prime solution not only for numerous engines—jet, turoprop, turboshaft as well as for helicopters and other VTOL/VSTOL aircraft. This is a prime solution for engines and power plants and the like. Thus a guard(s)/cap(s) and/or screens along with the mechanism is significant. A casing may be added as deemed fit shown as numeral 52. Alternate screen/guards as illustrated in FIGS. 23–45 can also be incorporated into the embodiment illustrated in FIG. 2.

FIG. 3 shows an isometric partial expanded view of a multi vane double guards/caps and/or screens with engine attached apparatus and/or pole, with rotational systems. Centrifuge chamber/manifold particle collector-separator shown with expanded view as well as multiple extensions/rods 46a—18 for example, (exhibited in the inward position towards the security apparatus), exhibited in FIG. 2.

FIG. 4 shows an isometric partial view of a multi vane double guards/caps and/or screens with engine attached apparatus and/or pole, with rotational systems. Centrifuge chamber/manifold particle collector-separator shown with expanded view as well as multiple extensions/rods 46c-18 for example, (exhibited in the outwards position of the security apparatus).

FIG. 5 shows a cross-sectional view of the separator exhibited in FIG. 1 numerals 12a and 12b, as well as exhibited in FIG. 2 numerals 12a and 12b. Thus the separator-three turning vanes each of which extends an acruate distance of approximately 120 degrees, (for example) it can be seen that no particle need travel more than a circumferential distance of 120 degrees (for example) before entering the extraction manifold from which rebound into the engine inlet is reduced. Variances in degrees can occur with structural configuration of guard(s)/cap(s) and/or screen(s), we note that separators turning vanes in FIG. 1 and FIG. 2 are exhibited on the conical/cone (for example).

FIG. 6 shows ejector systems numeral 40 includes the control valve numeral 42 for controlling the amount of air bled from the compressor FIG. 1 and FIG. 2 numeral 24 thus flow of the fluid through the conduits FIG. 1 and FIG. 2 numerals 20a and 20b to increase efficiency of the gas turbine engine. When particle collector separation is not deemed necessary the ejector system may be used to interrupt the flow of bled air. A modulating valve exhibited in FIG. 6 numeral 44 regulates the flow in the conduit thereby increasing engine efficiency.

FIG. 7 shows the manifold sectional; thereby attached to the engine apparatus and/or pole-(apparatus can be single, or attached, fixed/secured on the engine attached apparatus and/or pole, or fixed/secured on the guard(s)/cap(s) and/or screen(s).

Figure 8:
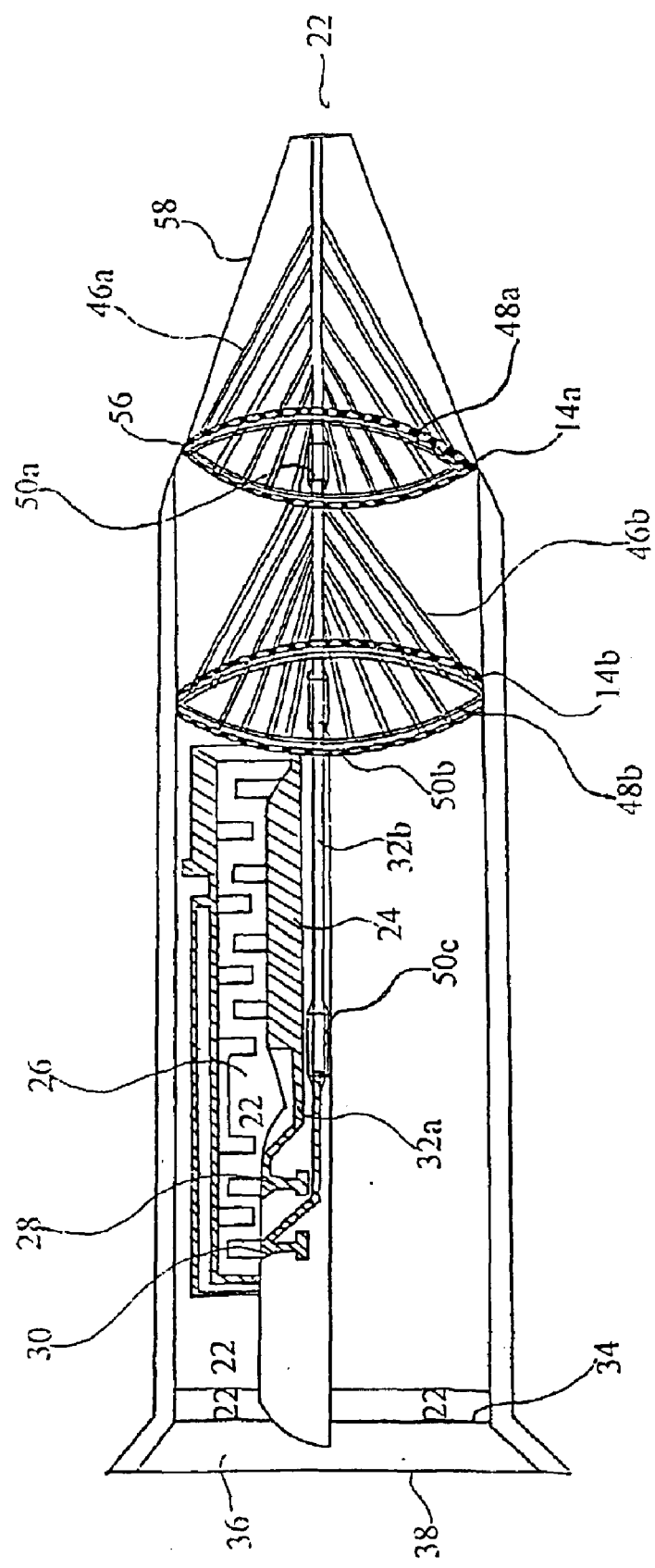
FIG. 8 shows an isometric partial view of the double guards/caps and/or screens with engine attached apparatus and/or pole, with rotational systems.

FIG. 8 illustrates another alternate embodiment of Single/Multiple Guard(s)/Cap(s) and/or Screen(s) with Engine Systems Attached Apparatus and/or Pole with Rotational System(s); exhibited in a isometric partial view of apparatus and noted that the guards/caps and/or screens (can be interchanged) is shown with longitudinal and latitudinal form. In FIG. 8 numeral 58 exhibits conical/cone with convex nose guard (conicals/cones may be suited for example are FIG. 47 thru FIG. 56 as well FIG. 10 numeral 60 the darted conical/cone) exhibiting cowl and/or base as numeral 56 thereby attached to the rotational systems noted in rectangular form exhibited as numerals 14a and 14b—this is one of the manipulations shown in FIG. 25. The rotational systems can be fixed to the guards cowl and/or base or as separate apparatus (of metal/material); thus the rotational systems 14a and 14b can be fixed/secured, adhered and/or attached to the nacelle/air inlet. FIG. 8 numerals 46a and 46b (exhibits extensions/rods—46a-10 extensions/rods, 46b 12 extensions/rods for example) can be separate apparatus-exhibits extension(s)/rod(s) which can be fixed/secured, adhered, and/or attached to the guard/cap and or screens; as well as fixed/secured, adhered and/or attached to the engine shaft extension(s) and/or pole apparatus. These extensions/rods numerals 46a and 46b can extend from the inward and/or outward portion of the guards/caps and/or screens; or from the screen latitudinal vane(s)—(if screen is added) and fixed/secured, attached and/or adhered to the inward portion of the guards/caps and/or screens. Extensions/Rods 46a and 46b can also be in multiples of 2/numerous in numbers and or odd numbers, extensions/rods may have a curved aperture for greater gas separation-of metal/material. Conicals/cones with multi vanes have a greater degree of gas separation thereby engine to function more efficiently.

As air numeral 22, passes through the inlet which is at a high velocity it is turned at such a downstream by the vanes, the air has both angular and axial velocity. This is known as imparting "swirl" to the fluid stream. Small particles of foreign matter entrained in the air stream arc carried along with the swirling air. The particles with greater mass are not of our concern due to the guard(s)/cap(s) and/or screen(s) are used for preventive measure. A particle entrained in the air stream will have both tangential and axial velocity downstream of the turning vanes. Both tangential and axial velocity in theory are not subjected to external forces travel in a straight line path to the outer periphery of the passage way. In practice, the swirling air has significant effect on the particles trajectory which can be compared roughly to that of a helix having increasing diameter in the downstream direction (as known). The rotational systems numerals 14a and 14b with or without treads/threads numerals 48a and 48b shall enable gas separation to take place as well as guard from foreign objects. The gaseous fluid or air shown as numeral 22 entering the engine through the inlet passes through the compressor numeral 24 where it is compressed, and hence to the combustor numeral 26 where the air is mixed with fuel and burned. The hot gases of combustion emerges at high velocity from the combustor numeral 26 and passes sequentially through the high pressure turbine numeral 28 and low pressure turbine numeral 30 where gases are expanded to extract energy there from. Energy extracted from the hot gases by turbine numeral 28 provides the driving force for the compressor numeral 24 which is connected to turbine 28 by shaft numeral 32a. Energy extracted from the hot gases by turbine numeral 30 provides the driving force for the main engine drive shaft numeral 32b which delivers power to an energy using device, such as helicopter rotor system, (not exhibited). After exiting turbine numeral 30 the hot gases of combustion passes through the engine exhaust duct numeral 34 which-includes diffuser numeral 36 in which case gases are expanded and exit the engine numeral 38. This is the formal function of numerous jet engines. Ejector systems as well as conduits may also be added (not exhibited in FIG. 8 but exhibited in FIG. 1 and FIG. 2) FIG. 6 numeral 40 includes control valve FIG. 6 numeral 42 for controlling the amount of air bled from the compressor numeral 24 thus flow of the fluid through the conduits means numerals 20a and 20b to increase efficiency of the gas turbine engine. A modulating valve FIG. 6 numeral 44 regulates the flow in the conduit thereby increasing engine efficiency. The guards/caps and/or screens as well as the rotational system 14a and 14b shown in FIG. 8 numeral 58 are also deemed appropriate use and possible to be used in FIG. 31 thru FIG. 56 for example (of metal/material) thus can be fastened inside the air inlet of the aircraft; as well as fastened to the nacelle exterior portion; and/or in the air inlet extending out to the nacelle. This is also held true for FIG. 59 the spherical and/or round structural support frame, with or without rotational system and/or treads/threads shown as serrated (for example). We note support frame can take numerous forms such as FIG. 57 rhombus and FIG. 58 parallelogram (for example). The guards/caps and/or screens can be fixed to the guards and/or guard frame and/or as separate apparatus. Thus inventing the treads/threads (for example) of the rotational systems production of various functions and movement shall therefore allow gas separation to occur—examples of movement and function is swift, pivot, clockwise (for example), time delayed, automated systems and/or hydraulics (for example-and/or for opening or closure of apparatus). Numeral 32b exhibits the engine shaft extension(s) attachment and/or pole (of metal/material) thus adhered, fixed/secured and/or attached to the guards/caps, screens and/or extensions. Numeral 32a exhibits shaft from the high pressure turbine. Numeral 50a, 50b and 50c the secure/fixed, adhered, apparatus (of metal/material) attached to the engine and to the engine shaft extension(s) and/or pole-screens that allows apparatus to be secure/fixed. Therefore, also allowing the continuos motion from the engine to occur without obstruction or further automation thereby inducing motion and creating the rotation and/or function for gas separation to occur without minimizing engine thrust we have created a higher performance engine. Note: Since the particles of matter are of small nature due to the guard(s)/cap(s) and/or screen(s) in not allowing large matter to be ingested, particles may also remain in the collection chamber(s) (not exhibited in FIG. 8 but shown in FIG. 1 and FIG. 2 numerals 18a and 18b) but which can be enclosed once particles enter from the duct(s), thereby offering an additional solution to this problem. This is a prime solution not only for numerous engines—jet, turoprop, turboshaft as well as for helicopters and other VTOL/VSTOL aircraft. This is a prime solution for engines and power plants and the like. Thus a guard(s)/cap(s) and/or screens along with the mechanism is significant. A casing may be added as deemed fit shown in FIG. 1 and FIG. 3 numeral 52.

Figure 9:
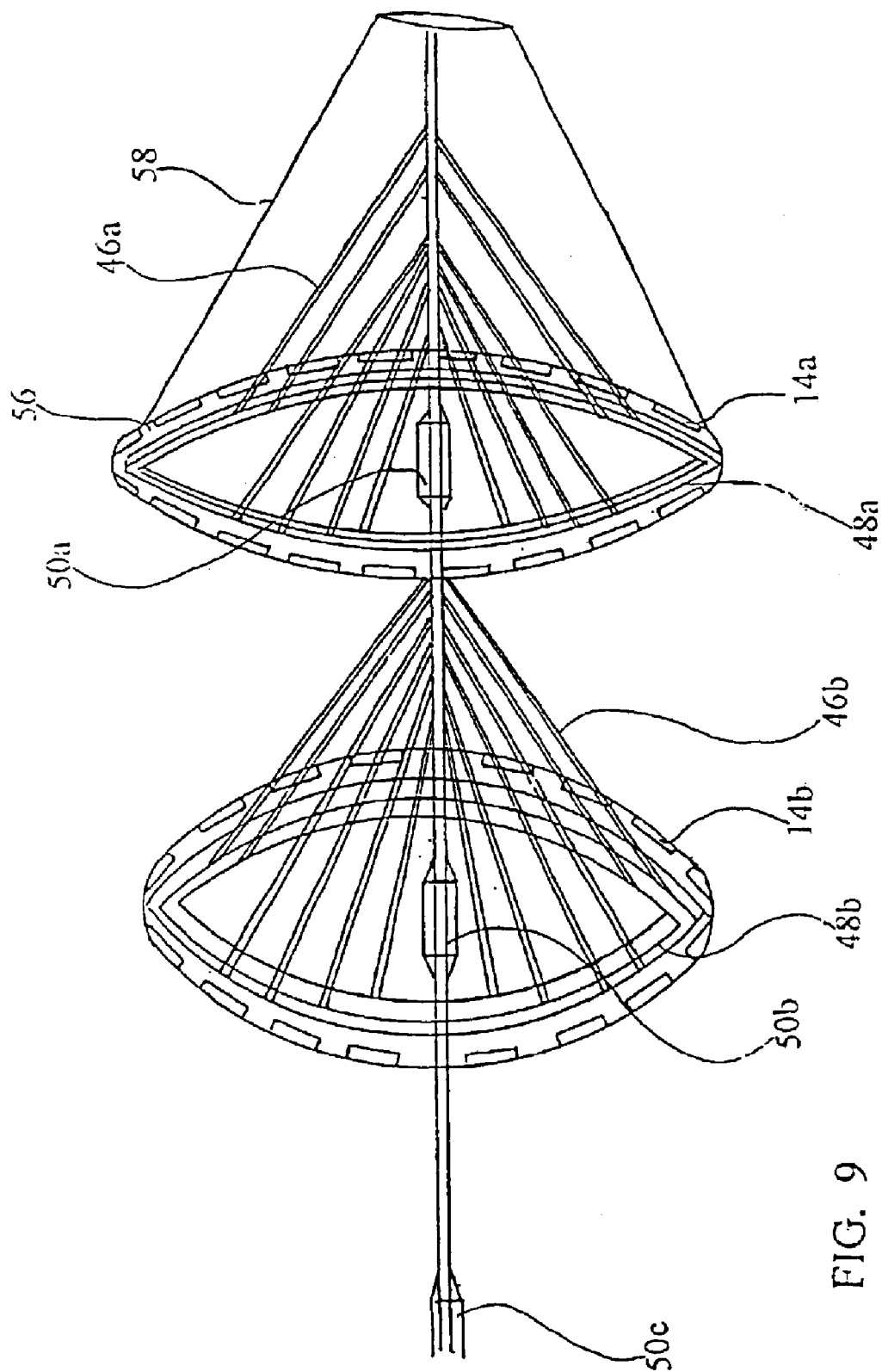
FIG. 9 shows an isometric partial expanded view of a double guards/caps and/or screen with engine attached apparatus and/or pole, with rotational systems.

FIG. 9 shows an isometric partial expanded view of a double guards/caps and/or screens with the engine attached apparatus and/or pole, with rotational system.

The following apparatus are various manipulations of the rotational systems (FIG. 23 thru FIG. 45—rotational systems and/or screens/guards are of metal/material and can be in numerous forms-thus for example) can be separate apparatus and/or secured/fixed, adhered and/or attached to the cowls and/or base with or without treads/threads-as well as numerous methods can be used other than treads/threads (for example). Variance in raised and or lowered in degrees of vanes, may also take a fly wheel composition FIG. 37 thru FIG. 43 allowing additional gas separation to occur and turbine motion as well as used in guards (can be used with conicals/cones). The addition of a mesh 46a thru 46d can be used in FIG. 23 thru FIG. 45 and in other mechanisms. Devices may also be stationary for other engines and power plants and the like. All devices are independent (and may also have a curved aperture-for example) and thus can be interchanged on all apparatuses. Alternate screen/guards as discussed above and illustrated in FIGS. 23–45 can also be incorporated into the embodiment illustrated in FIG. 3.

Figure 10:
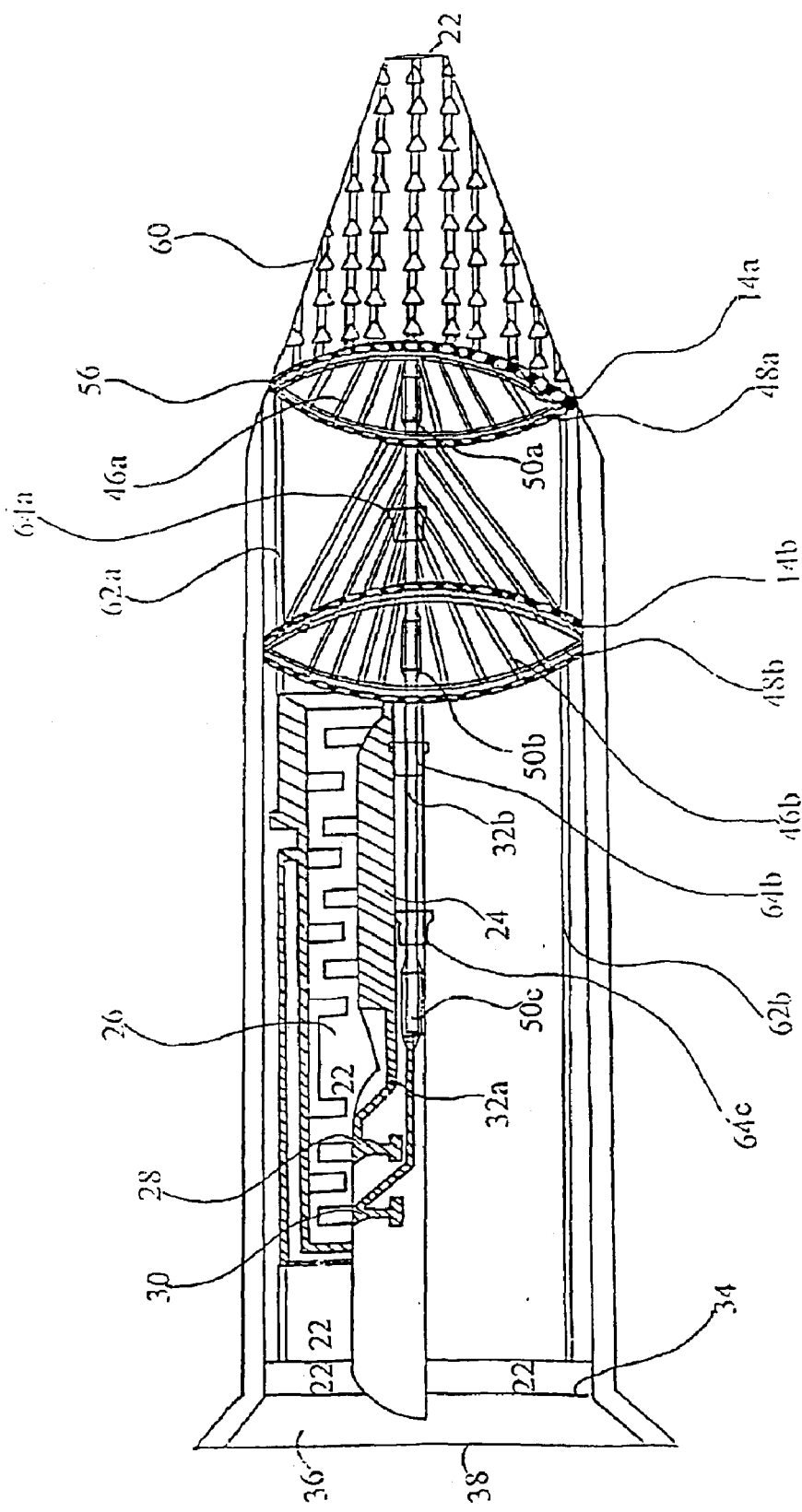
FIG. 10 shows an isometric view of a retractable double guards/caps and/or screens with engine attached apparatus and/or pole, with rotational systems.

FIG. 10 represents another alternate embodiment of Single/Multiple Guard(s)/Cap(s) and/or Screen(s) with Engine Systems Retractable Attached Apparatus and/or Pole with Rotational System(s) exhibited in a isometric partial view of apparatus and noted that the guards/caps and/or screens (can be interchanged) is shown with longitudinal and latitudinal form. In FIG. 10 numeral 60 exhibits the darted conical/cone with convex nose guard, (conicals/cones may be suited for example are FIG. 47 thru FIG. 56) exhibiting cowl and/or base as numeral 56 and a plurality of spokes 46a, 46b, pivotally attached on one end to the base 56 forming a cone shape in one position where the spokes 46a, 46b generally divergent on one end as shown, for example, in FIG. 10 and a one or more intermediate positions, for example, as shown in FIGS. 12–14 wherein the angle between the spokes 46a, 46b and the shaft 32b is varied from that shown in FIG. 10. The base 56 may be attached to the rotational systems noted in rectangular form exhibited as numerals 14a and 14b—this is one of the manipulations shown in FIG. 25. The rotational systems can be fixed to the guards cowl and/or base or as separate apparatus (of metal/material); thus the rotational systems 14a and 14b can be fixed/secured, adhered and/or attached to the nacelle/air inlet. FIG. 10 numerals 46a and 46b (exhibits extensions/rods—46a-10 extensions/rods, 46b 12 extensions/rods for example) can be separate apparatus-exhibits extension(s)/rod(s) which can be fixed/secured, adhered, and/or attached to the guard/cap and or screens; as well as fixed/secured, adhered and/or attached to the engine shaft extension(s) and/or pole apparatus. These extensions/rods numerals 46a and 46b can extend from the inward and/or outward portion of the guards/caps and/or screens; or from the screen latitudinal vane(s), (if screen is added) and fixed/secured, attached and/or adhered to the inward portion of the guards/caps and/or screens. Extensions/Rods 46a and 46b can also be in multiples of 2/numerous in numbers and or odd numbers, extensions/rods may have a curved aperture for greater gas separation-of metal/material. Conicals/cones with multi vanes have a greater degree of gas separation thereby engine to function more efficiently. As air numeral 22, passes through the inlet which is at a high velocity it is turned at such a downstream by the vanes, the air has both angular and axial velocity. This is known as imparting "swirl" to the fluid stream. Small particles of foreign matter entrained in the air stream are carried along with the swirling air. The particles with greater mass are not of our concern due to the guard(s)/cap(s) and/or screen(s) are used for preventive measure. A particle entrained in the air stream will have both tangential and axial velocity downstream of the turning vanes. Both tangential and axial velocity in theory are not subjected to external forces travel in a straight line path to the outer periphery of the passage way. In practice, the swirling air has significant effect on the particles trajectory which can be compared roughly to that of a helix having increasing diameter in the downstream direction (as known). The rotational systems numerals 14a and 14b with or without treads/threads numerals 48a and 48b shall enable gas separation to take place as well as guard from foreign objects. The gaseous fluid or air shown as numeral 22 entering the engine through the inlet passes through the compressor numeral 24 where it is compressed, and hence to the combustor numeral 26 where the air is mixed with fuel and burned. The hot gases of combustion emerges at high velocity from the combustor numeral 26 and passes sequentially through the high pressure turbine numeral 28 and low pressure turbine numeral 30 where gases are expanded to extract energy there from. Energy extracted from the hot gases by turbine numeral 28 provides the driving force for the compressor numeral 24 which is connected to turbine 28 by shaft numeral 32a. Energy extracted from the hot gases by turbine numeral 30 provides the driving force for the main engine drive shaft numeral 32b which delivers power to an energy using device, such as helicopter rotor system, (not exhibited). After exiting turbine numeral 30 the hot gases of combustion passes through the engine exhaust duct numeral 34 which includes diffuser numeral 36 in which case gases arc expanded and exit the engine numeral 38. This is the formal function of numerous jet engines. Ejector systems and centrifuge vanes may also be added thus as well as the conduits if deemed to (not exhibited in FIG. 10 but exhibited in FIG. 1 and FIG. 2) FIG. 6 numeral 40 includes control valve FIG. 6 numeral 42 for controlling the amount of air bled from the compressor numeral 24 thus flow of the fluid through the conduits means numerals 20a and 20b to increase efficiency of the gas turbine engine. A modulating valve FIG. 6 numeral 44 regulates the flow in the conduit thereby increasing engine efficiency. The guards/caps and/or screens as well as the rotational system 14a and 14b shown in FIG. 10 numeral 60 (darted guard) are also deemed appropriate use and possible to be used in FIG. 31 thru FIG. 56 for example (of metal/material) thus can be fastened inside the air inlet of the aircraft; as well as fastened to the nacelle exterior portion; and/or in the air inlet extending out to the nacelle. This is also held true for FIG. 59 the spherical and/or round structural support frame, with or without rotational system and/or treads/threads shown as serrated (for example). We note support frame can take numerous forms such as FIG. 57 rhombus and FIG. 58 parallelogram (for example). The guards/caps and/or screens can be fixed to the guards and/or guard frame and/or as separate apparatus. Thus inventing the treads/threads (for example) of the rotational systems production of various functions and movement shall therefore allow gas separation to occur—examples of movement and function is swift, pivot, clockwise (for example), time delayed, auto-mated systems and/or hydraulics (for example-and/or for opening or closure of apparatus). Numeral 32b exhibits the engine shaft extension(s) attachment and/or pole (of metal/material) thus adhered, fixed/secured and/or attached to the guards/caps, screens and/or extensions. Numeral 32a exhibits shaft from the high pressure turbine. Numeral 50a, 50b and 50c the secure/fixed, adhered, apparatus (of metal/material) attached to the engine and to the engine shaft extension(s) and/or pole-screens that allows apparatus to be secure/fixed. Therefore, also allowing the continues motion from the engine to occur without obstruction or further automation thereby inducing motion and creating the rotation and/or function for gas separation to occur without minimizing engine thrust we have created a higher performance engine. Note: Since the particles of matter are of small nature due to the guard(s)/cap(s) and/or screen(s) in not allowing large matter to be ingested, particles may also remain in the collection chamber(s) (not exhibited in FIG. 10 but shown in FIG. 1 numerals 18a and 18b and FIG. 2 numerals 18a and 18b) but which can be enclosed once particles enter from the duct(s), thereby offering an additional solution to this problem. Formal retraction process shall commence by the conical/cone thus with dispersing movement (shown in FIG. 12, 13 and 14) by center axis in multiples of 2 in numbers and/or odd numbers thus retract over the inlet and thus allow the extensions/rods to commence into a folding and/or are laced pattern for example as thus the conical/cone may also be deemed into a folding or laced pattern (shown by isometric partial expanded view FIG. 11) which shall be taken into account by the type of inlet of a particular aircraft as well as the type of engine. This can also be a significant process for other engines and power plants and the like. FIG. 10 numerals 62a and 62b exhibit the retraction slots in which case for example the use hydraulics/automation process shall commence. The retraction apparatus exhibited as FIG. 10 numerals 64a, 64b, and 64c shall allow the attached apparatus and/or pole to be condensed within the pole in a stacking manner or on the exterior portion of the pole in a stacking matter-for example-FIG. 18 and FIG. 19 exhibit a expanded view of retractors (this shall very on the type of aircraft and/or engine). If centrifuge chamber manifold particle collector is deemed fit to use thus variance on the type of aircraft and/or engine as well as power plants and the like-similar process shall commence thereby a folding and/or laced pattern—for example. Prior works exhibit aircraft conicals/cones used for directional purposes by means of hydraulic movement thus back and forth although a lack of efficiency and energy has not allowed these types of aircraft to attain the highest performance deemed possible, by the use of the rotational system(s) and being cost effective and efficient we attain a higher degree of performance that allows gas separation to take place as well as maintaining and not compromising the engine thrust. The multi vane conical—for example offers a greater degree of gas separation than a solid conical. Variance in guards/caps and/or screens vanes and/or mesh offer variances in degrees of gas separation. Thus, the three centrifuge multi vane conical/cone exhibited as FIG. 55 exhibits offers centrifuge process on the external means of conical thereby offering as well as direction this is also deemed similar in nature with FIG. 56 the multi vane centrifuge deflector conical/cone offers gas separation, directional purposes as well as deflecting shrapnel from enemies attack. This is a prime solution not only for numerous engines—jet, turoprop, turboshaft as well as for helicopters and other VTOL/VSTOL aircraft. This is a prime solution as well as for engines and power plants and the like. Thus a guard(s)/cap(s) and/or screens along with the mechanism is significant. A casing may be added as deemed fit shown in FIG. 1 and FIG. 3 numeral 52.

FIG. 9 shows an isometric partial expanded view of a double guards/caps/and/or screens with the engine attached apparatus and/or pole, with rotational system. In addition, alternate screen/guards as discussed above can be incorporated into the embodiment illustrated in FIG. 10.

The following apparatus are various manipulations of the guards/caps with conical/cones (apparatus can be independent), shown with cowls and/or base can be fixed/secured, adhered and/or attached; thus by being fixed/secured, adhered, and/or attached to the rotational rings (apparatus can be separate) of FIG. 1 numerals 14a and 14b with or without treads/threads. Extensions/Rods FIG. 1 numerals 46a and 46b (apparatus can be independent and may have a curved aperture), can be fixed/secured, adhered, positioned and/or attached to the guards/caps and/or screens; as well as to the engine shaft extension attachment and/or pole, and/or rotational systems apparatus. All guard/cap noses can be convex/concave, pointed and solid (for example) as well as other manipulations listed (apparatus independently and/or whole can be of metal/material):

FIG. 47 the guard/cap shown as conical/cone, with multiple longitudinal and latitudinal lines/vanes form (rectangular-convex nose of the guard) shown to adhere to the cowls and/or base, as well as adhering to the rotational rings numerals 14a and 14b with or without treads/threads; thus can be applied to FIG. 23 thru FIGS. 45, 57, 58 and 59 respectively.

FIG. 48 the guard/cap shown as conical/cone, with multiple longitudinal and latitudinal lines/vanes form (convex nose of the guard with smaller scale of graduating metal/material or larger scale of metal/material-the nose of the guard/cap can be interchanged with other manipulations) shown to adhere to the cowls and/or base, as well as adhering to the rotational rings numerals 14a and 14b with or without treads/threads; thus can be applied to FIG. 23 thru FIGS. 45, 57, 58 and 59 respectively.

FIG. 49 the guard/cap shown as conical/cone, solid form (convex nose guard) shown to adhere to the cowls and/or base, as well as adhering to the rotational rings numeral 14a and 14b with or without treads/threads; thus can be applied to FIG. 23 thru FIGS. 45, 57, 58, and 59 respectively.

FIG. 50 the guard/cap shown as conical/cone, with multiple longitudinal lines/vanes form (convex nose guard) shown to adhere to the cowls and/or base, as well as adhering to the rotational rings numeral 14a and 14b with or without treads/threads; thus can be applied to FIG. 23 thru FIGS. 45, 57, 58 and 59 respectively. Not shown, although deemed fit is the conical/cone, with multiple latitudinal lines/vanes form (convex nose guard) thus can adhere to the cowls and/or base, as well as adhering to the rotational rings numeral 14a and 14b with or without treads/threads; thus can be applied to FIG. 23 thru FIGS. 45, 57, 58 and 59 respectively.

FIG. 51 the guard/cap shown as conical/cone, with multiple longitudinal lines/vanes form (convex nose guard) shown to adhere to the cowls and/or base, as well as adhering to the rotational rings numerals 14a and 14b with or without treads/threads; thus can be applied to FIG. 23 thru FIGS. 45, 57, 58 and 59 respectively.

FIG. 52 the guard/cap shown as conical/cone, pierced triangular form—multiple in piercing (convex nose guard, can be various patterns of piercing) shown to adhere to the cowls and/or base, as well as adhering to the rotational rings numerals 14a and 14b with or without treads/threads; thus can be applied to FIG. 23 thru FIGS. 45, 57, 58 and 59 respectively.

FIG. 53 the guard/cap shown as conical/cone, with multiple latitudinal lines/vanes form (convex nose guard with nose guard and/or with cylindrical latitude form as conical/cone) shown to adhere to the cowls and/or base, as well as adhering to the rotational rings numerals 14a and 14b with or without treads/threads; thus can be applied to FIG. 23 thru FIGS. 45, 57, 58 and 59 respectively. Note, the conical/cone may also take a latitudinal lines/vanes.

FIG. 54 the guard/cap shown as conical/cone pierced triangular form—multiple piercing as well as longitudinal form (convex nose can also be in other forms-with the addition of latitudinal lines/vanes may offer additional obstruction shown to adhere to the cowls and/or base, as well as adhering to the rotational rings numerals 14a and 14b with or without treads/threads; thus can be applied to FIG. 23 thru FIGS. 45, 57 58 and 59 respectively.

FIG. 55 the guard/cap shown as conical/cone with multiple longitudinal lines/vanes (convex nose guard) and centrifuge process on the exterior of the conical/cone thus offering centrifuging process by turning vanes each extending an arcuate distance of approximately 120 degrees, (for example), shown to adhere to the cowls and/or base, as well as adhering to the rotational ring numerals 14a and 14b with or without treads/threads; thus can be applied to FIG. 23 thru FIGS. 45, 57, 58 and 59 respectively. Note: conical/cone may also take a latitudinal lines/vanes—not shown.

FIG. 56 the guard/cap shown as conical/cone with multiple longitudinal lines/vanes (convex nose guard) with exterior of a series of turning vanes each extending an arcuate distance of approximately 120 degrees—for example (degrees may vary depending on how may vanes arc added to the conical/cone); shown to adhere to the cowls and/or base, as well as adhering to the rotational ring numerals 14a and 14b with or without treads/threads; thus can be applied to FIG. 23 thru FIGS. 45, 57, 58 and 59 respectively. This conical is prime for deflecting shrapnel and thus returning shrapnel to the enemy without causing obstruction to engine components and yet offer maximization of gas separation. Note; conical/cone may also take a latitudinal lines/vanes-not shown.

The following device is the "Structural Support Frame System," if for numerous jets, turboprop, turboshaft, and other VTOL/VSTOL as well as engines and power plants and the like; with or without rotational system as well as with or without treads/threads (for example). Rotational system may be within the structural support frame and/or prior to the structural support fame and/or henceforth after. Possible inclusion, of the guard(s)/cap(s) and/or screen(s) with the "Structural Support Frame System."

FIG. 57 the structural support frame system shown in rhombus form with rectangular rotational system shown as FIG. 25, can be fixed/secured, adhered, and/or attached inside the air inlet of the aircraft, as well as fastened to the nacelle exterior portion, and/or in the air inlet extending out the nacelle (of metal/material).

FIG. 58 the structural support frame system shown in parallelogram form with rectangular rotational system shown as FIG. 25 can be fixed/secured, adhered, and/or attached inside the air inlet of the aircraft as well as fastened to the nacelle exterior portion, and/or in the air inlet extending out the nacelle (of metal/material).

FIG. 59 the structural support frame system shown in spherical and/or round form with rectangular rotational system shown as FIG. 25 can be fixed/secured, adhered, and/or attached inside the air inlet of the aircraft as well as fastened to the nacelle exterior portion, and/or in the air inlet extending out to the nacelle (of metal/material).

The following apparatus are nose guards/caps shown in conical/cone form with various interchanging nose guard/cap-may take the configuration of convex, concave and/or solid-for example. All nose guards are independent and thus can be applicable and interchangeable on all conicals/cones. The following are manipulations of the conical/cones nose guards/caps:

FIG. 60. nose guard/cap shown as conical/cone form is solid formation (cone pointed). Such nose guard/cap can be solid in whole and/or partial and in kind.

FIG. 61. nose guard/cap shown as conical/cone form has multiple longitudinal and latitudinal lines/vanes form (cone pointed). Such a nose guard/cap can be solid in whole and/or partial and in kind.

FIG. 62 nose guard/cap shown as conical/cone form is solid formation (convex form).

Such a nose guard/cap shown can be solid in whole and/or partial and in kind.

FIG. 63 nose guard/cap shown as conical/cone form has multiple longitudinal and latitudinal lines/vanes form (convex form). Such a nose guard/cap shown can be solid in whole and/or partial and in kind.

FIG. 64 nose guard/cap shown as conical/cone form is solid formation (rectangular form). Such a nose guard/cap shown can be solid in whole and/or partial and in kind.

FIG. 65 nose guard/cap shown as conical/cone form has longitudinal and latitudinal lines/vanes form (rectangular form). Such a nose guard/cap shown can be solid in whole and/or to partial and in kind.

FIG. 66 nose guard/cap shown as conical/cone form is solid formation (concave fomm).

Such a nose guard/cap shown can be solid in whole and/or partial and in kind.

FIG. 67 nose guard/cap shown conical/one form has longitudinal and latitudinal lines/vanes form (concave form). Such a nose guard/cap can be solid in whole and/or partial is and in kind.

Figure 11:
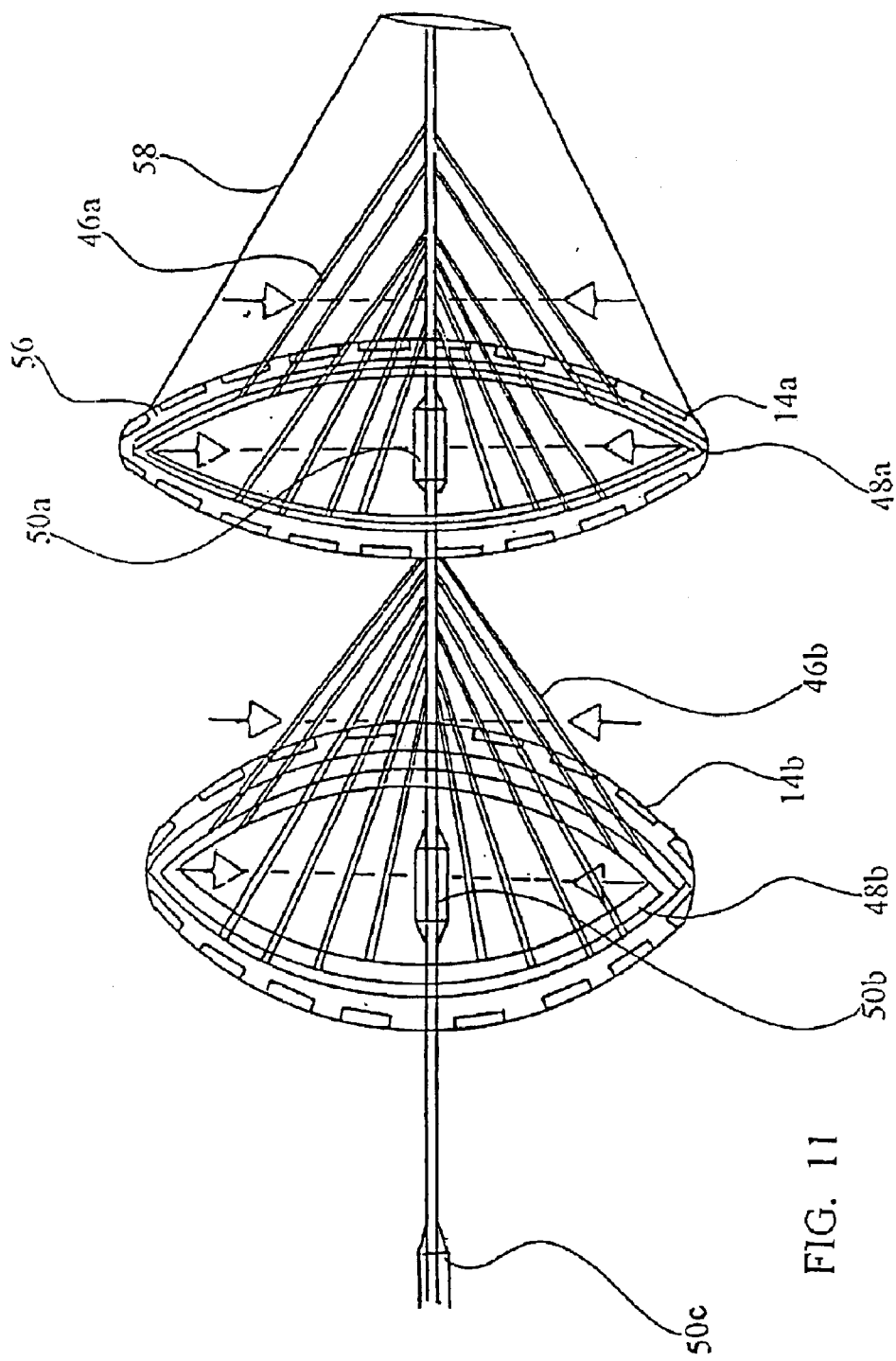
FIG. 11 shows an isometric partial expanded view of the double guard/caps and/or screens with engine attached apparatus and/or pole, with rotational systems; exhibits folding and/or laced pattern for retraction process.

FIG. 11 shows an isometric partial expanded view of the double guards/caps and/or screen with the engine attached apparatus and/or pole, with rotational systems. The formal process and thus description of is noted in FIG. 10 although in FIG. 11 we note the solid partial view conical as numeral 58.

FIG. 12 shows dispersing of a conical exhibited in numeral 66 and thus exhibiting cowl numeral 56 for retraction process; conical may take a multiple forms for example FIG. 47 thru FIG. 56. Dispersing for example may be in multiples of 2 in numbers and/or odd numbers-of metal/material.

FIG. 13 shows dispersing of a conical exhibited in numeral 66 and thus exhibiting cowl numeral 56 for retraction process; conical may take a multiple forms for example FIG. 47 thru FIG. 56. Dispersing for example may be in multiples of 2 in numbers and/or odd numbers-of metal/material. Exhibiting also 54a the additional multi vane conical; as dispersing occurs the multi vane conical is exhibited to the forefront by hydraulic/automated means to maintain the integrity of the engine components as dispersing occurs.

FIG. 14 shows dispersing of a conical exhibited in numeral 66 and thus exhibiting cowl numeral 56 for retraction process; conical may take a multiple forms for example FIG. 47 thru FIG. 56. Dispersing for example may be in multiples of 2 in numbers and/or odd numbers-of metal/material. Exhibiting also 54b the additional multi vane conical with spherical vanes; as dispersing occurs the multi vane conical is exhibited to the forefront by hydraulic/automated means to maintain the integrity of the engine components as dispersing occurs.

FIG. 15 shows the engine shaft extension security attachment and/or pole, diamond form (for example). This device shall allow security to be maintained without obstruction of function by the rotational system(s).

FIG. 16 shows the engine shaft extension security attachment and/or pole, cylindrical form (for example). This device shall allow security to be maintained without obstruction of function by the rotational system(s).

FIG. 17 shows the engine shaft extension security attachment and/or pole, in rectangular form (for example). The device shall allow security to be maintained without obstruction of function by the rotational system(s).

FIG. 18 shows the multiple section engine attachment for retraction process of the apparatus and/or pole, this device may be used in FIG. 10. Not exhibited although deemed fit is the multi-laced engine attachment apparatus and/or pole may also have retracting properties or without (for example).

FIG. 19 shows multiple section engine attachment for retraction process of the apparatus and/or pole, exhibited in FIG. 10 numerals 64a, 64b, and 64c.

FIG. 20 shows longitudinal apparatus and/or pole for numerous dual inlets, with dual extending apparatus from the pole for the inlet—thus shall function similar to engine shaft attached apparatus and/or pole although for a dual inlet. This device may also be used for other engines and power plants and the like.

FIG. 21 shows longitudinal engine attached apparatus and/or pole for inlet, this device may also be used for other engines and power plants and the like.

FIG. 22 shows longitudinal attached apparatus and/or pole for numerous dual inlet, with dual extending apparatus for both/opposite side of the pole for the inlet, this device may also be use for other engines and power plants and the like.

Obviously, many modifications and variations of the present invention are possible in light of the above teachings. Thus, it is to be understood that, within the scope of the appended claims, the invention may be practiced otherwise than as specifically described above.

What is claimed is:

1. An air intake system, for a turbine having a housing for use in an intake cavity comprising:
   one or more guards mounted for rotational movement configured to be in communication with said area intake cavity and said housing;
   one or more rotating vanes mounted for rotational movement defining a centrifuge chamber, said vanes configured to conform to the shape of said air intake cavity; and
   a passageway in communication with said centrifuge chamber for collecting particles in said centrifuge chamber, said passageway formed as a part of said housing and extending axially along said housing; and
   an outlet chamber in communication with said centrifuge chamber for discharging said foreign particles outside said housing, wherein said system includes two guards and wherein the shape of said air intake cavity is cylindrical.

2. The system as recited in claim 1, wherein said two guards are spaced apart and define said centrifuge chamber there between.

3. The system as recited in claim 1, wherein said predetermined shape is conical.

4. The system as recited in claim 1, wherein said one or more guards are retractable.

5. An air intake guard system for a turbine for use in an air intake cavity comprising:
   one or more guards disposed in said air intake cavity, said one or more guards mounted for rotational movement;
   one or more rotating vanes defining a centrifuge; and
   a discharge passageway in communication with said centrifuge for receiving and discharging articles collected in saved centrifuge.

6. The system as recited in claim 5, wherein said one or more rotating vanes are configures to retractable.

* * * * *

UNITED STATES PATENT AND TRADEMARK OFFICE
CERTIFICATE OF CORRECTION

PATENT NO. : 6,872,232 B1  Page 1 of 1
APPLICATION NO. : 10/148507
DATED : March 29, 2005
INVENTOR(S) : Marina E. Pavaiatos It is certified that error appears in the above-identified patent and that said Letters Patent is hereby corrected as shown below:

Column 24,
Lines 60-64, should read as follows:
-- a discharge passageway in communication with said centrifuge for receiving and discharging articles collected in said centrifuge.

6. The system as recited in claim 5, wherein said one or more rotating vanes are configures to be retractable. --.

Signed and Sealed this

Twenty-seventh Day of June, 2006

JON W. DUDAS
*Director of the United States Patent and Trademark Office*

UNITED STATES PATENT AND TRADEMARK OFFICE
CERTIFICATE OF CORRECTION

PATENT NO. : 6,872,232 B1  
APPLICATION NO. : 10/148507  
DATED : March 29, 2005  
INVENTOR(S) : Marina E. Pavlatos Page 1 of 1

It is certified that error appears in the above-identified patent and that said Letters Patent is hereby corrected as shown below:

Column 24,
Lines 60-64, should read as follows:
-- a discharge passageway in communication with said centrifuge for receiving and discharging articles collected in said centrifuge.

6. The system as recited in claim 5, wherein said one or more rotating vanes are configures to be retractable. --.

This certificate supersedes Certificate of Correction issued June 27, 2006.

Signed and Sealed this

Sixth Day of March, 2007

JON W. DUDAS  
*Director of the United States Patent and Trademark Office*